US012674968B2

(12) United States Patent
Lee et al.

(10) Patent No.: US 12,674,968 B2
(45) Date of Patent: Jul. 7, 2026

(54) LENS ASSEMBLY AND ELECTRONIC DEVICE INCLUDING THE SAME

(71) Applicant: Samsung Electronics Co., Ltd., Gyeonggi-do (KR)

(72) Inventors: Hwanseon Lee, Gyeonggi-do (KR); Haneung Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 421 days.

(21) Appl. No.: 17/898,601

(22) Filed: Aug. 30, 2022

(65) Prior Publication Data

US 2023/0131146 A1 Apr. 27, 2023

Related U.S. Application Data

(63) Continuation of application No. PCT/KR2022/008781, filed on Jun. 21, 2022.

(30) Foreign Application Priority Data

Oct. 27, 2021 (KR) ......................... 10-2021-0144752
Nov. 23, 2021 (KR) ......................... 10-2021-0161887

(51) Int. Cl.
G02B 15/14 (2006.01)
G02B 13/00 (2006.01)
(Continued)

(52) U.S. Cl.
CPC ... G02B 15/143503 (2019.08); G02B 13/009 (2013.01); G02B 13/02 (2013.01);
(Continued)

(58) Field of Classification Search
CPC .. G02B 13/02; G02B 13/009; G02B 13/0045; G02B 13/0065; G02B 27/0025;
(Continued)

(56) References Cited

U.S. PATENT DOCUMENTS 5,289,317 A * 2/1994 Ikemori ............... G02B 15/177
                                                                      359/716
6,285,515 B1 * 9/2001 Kitazawa ............... G02B 5/005
                                                                      359/726
(Continued)

FOREIGN PATENT DOCUMENTS

CN        102707418 A        10/2012
JP        S575023 A *        1/1982
(Continued)

OTHER PUBLICATIONS

Rudolf Kingslake and R. Barry Johnson, Lens Design Fundamentals, 2010, Academic Press, 2nd Edition, p. 16 (Year: 2010).*
(Continued)

*Primary Examiner* — Bumsuk Won
*Assistant Examiner* — Alex Park Rickel
(74) *Attorney, Agent, or Firm* — Sughrue Mion, PLLC

(57) ABSTRACT

A lens assembly may include an image sensor, a first lens group disposed closest to an object side, the first lens group including multiple lenses and having negative power, a second lens group disposed to be moveable forward/backward along an optical axis direction, the second lens group having positive power, and a third lens group disposed to be moveable forward/backward along the optical axis direction, the third lens group including multiple lenses and having negative power, where the second or third lens group may move toward the object side so as to increase the focal length of the lens assembly, and the second lens group includes a lens having negative power and a lens having positive power and is disposed adjacent to the lens having negative power on the object side. In addition, various other embodiments may be possible.

16 Claims, 32 Drawing Sheets

(51) Int. Cl.

| | | |
|---|---|---|
| *G02B 13/02* | (2006.01) | |
| *G02B 27/00* | (2006.01) | |
| *H04N 23/54* | (2023.01) | |
| *H04N 23/55* | (2023.01) | |

(52) U.S. Cl.
CPC ......... *G02B 27/0025* (2013.01); *H04N 23/54* (2023.01); *H04N 23/55* (2023.01)

(58) Field of Classification Search
CPC ...... G02B 27/646; G02B 15/14; G02B 15/24; G02B 15/143503
See application file for complete search history.

(56) References Cited

U.S. PATENT DOCUMENTS

| | | | |
|---|---|---|---|
| 11,131,829 B2 | 9/2021 | Iwamoto | |
| 2006/0066953 A1 | 3/2006 | Nishio et al. | |
| 2007/0047103 A1 | 3/2007 | Fujisaki | |
| 2007/0188885 A1 | 8/2007 | Kawakami | |
| 2011/0157430 A1 | 6/2011 | Hosoya et al. | |
| 2014/0009841 A1* | 1/2014 | Ebe ...................... | G02B 15/177 |
| | | | 359/684 |
| 2016/0147050 A1* | 5/2016 | Fujikura .............. | H04N 23/663 |
| | | | 359/689 |
| 2016/0202457 A1 | 7/2016 | Li | |
| 2017/0184826 A1 | 6/2017 | Wu | |
| 2017/0293120 A1* | 10/2017 | Tashiro .......... | G02B 15/143503 |
| 2018/0224665 A1* | 8/2018 | Im ............................ | G02B 7/09 |
| 2019/0324236 A1 | 10/2019 | Kim et al. | |
| 2021/0063704 A1 | 3/2021 | Son et al. | |
| 2021/0063711 A1 | 3/2021 | Kodaira | |
| 2021/0080706 A1* | 3/2021 | Lin .................... | G02B 13/0065 |
| 2021/0149168 A1 | 5/2021 | Uehara | |
| 2021/0255368 A1* | 8/2021 | Hu ........................ | G06F 1/1626 |
| 2023/0116562 A1* | 4/2023 | Shim ................... | G02B 13/009 |
| | | | 359/686 |

FOREIGN PATENT DOCUMENTS

| | | |
|---|---|---|
| JP | 2005-77692 A | 3/2005 |
| JP | 2006-197198 A | 7/2006 |
| JP | 2007-219113 A | 8/2007 |
| JP | 6749631 B2 | 8/2020 |
| JP | 7277309 B2 | 5/2023 |
| KR | 10-2019-0121678 A | 10/2019 |
| KR | 10-2021-0027187 A | 3/2021 |
| WO | 2020/012639 A1 | 1/2020 |

OTHER PUBLICATIONS

International Search Report dated Sep. 19, 2022.
Extended European Search Report dated Nov. 11, 2024.

* cited by examiner

LONGITUDINAL
SPHERICAL ABER.

656.2700 NM
587.5600 NM
486.1300 NM

FOCUS (MILLIMETERS)

LENS ASSEMBLY AND ELECTRONIC DEVICE INCLUDING THE SAME

CROSS-REFERENCE TO RELATED APPLICATION(S)

This application is a continuation of International Application No. PCT/KR2022/008781, which was filed on Jun. 21, 2022 and claims priority to Korean Patent Application Nos. 10-2021-0144752, filed on Oct. 27, 2021, and 10-2021-0161887, filed on Nov. 23, 2021, in the Korean Intellectual Property Office, the disclosure of which are incorporated by reference herein their entirety.

BACKGROUND

Technical Field

One or more embodiments of the instant disclosure generally relate to an electronic device and, more specifically, to a lens assembly and an electronic device including the same.

Description of Related Art

There has been widespread use of lens assemblies, for example, cameras capable of capturing photographs or videos, and there has recently been widespread use of digital cameras or video cameras having solid-state image sensors such as charge coupled devices (CCD) or complementary metal-oxide semiconductors (CMOS). Lens assemblies equipped with solid-state image sensors (CCD or CMOS) can store and copy images and/or transmit images between electronic devices more easily than film-type lens assemblies, and thus are replacing film-type lens assemblies.

Recently, a single electronic device may be equipped with multiple lens assemblies. For example, a single electronic device may include two or more of a close-up camera, and a telephoto camera, and/or a wide-angle camera, thereby improving the quality of captured images, and it has become possible to give various visual effects to captured images. For example, subject images may be acquired through multiple cameras having different optical characteristics and synthesized, to generate high-quality captured images. Electronic devices (for example, mobile communication terminals or smartphones) have become able to acquire high-quality images by using multiple lens assemblies (for example, cameras) mounted thereon, and tend to gradually replace electronic devices dedicated to imaging functions (for example, digital cameras).

The above-described information may be provided as background technology for helping understanding of the disclosure herein. No claim or determination is raised regarding whether any of the above description can be applied as the prior art in connection with the disclosure herein.

SUMMARY

There may be difficulty in improving the performance of cameras or lens assemblies of electronic devices which have become compact and/or lightweight so as to be easily portable. For example, multiple lens assemblies are combined to improve image quality, but the minimal interior space of compact and/or lightweight electronic devices may make it difficult to equip the same with telephoto functions or zoom functions.

According to an embodiment of the disclosure, a lens assembly and/or an electronic device including the same may include an image sensor configured to capture an image of an object, a first lens group disposed closest to an object side in three lens groups sequentially arranged from the object toward an image sensor along an optical axis direction, the first lens group including multiple lenses and having negative power, a second lens group disposed to be moveable forward/backward along the optical axis direction between the image sensor and the first lens group, the second lens group having positive power, and a third lens group disposed to be moveable forward/backward along the optical axis direction between the image sensor and the second lens group, the third lens group including multiple lenses and having negative power, wherein the second lens group and/or the third lens group is configured to move toward the object side in a zooming operation so as to increase the focal length of the lens assembly, and the second lens group includes a lens having negative power and a lens having positive power and is disposed adjacent to the lens having negative power on the object side, and the lens assembly is configured to satisfy the following [Condition formula 1]:

$$0.1 \leq G2_{air}/tG2 \leq 0.3 \qquad \text{[Condition formula 1]}$$

wherein "G2_air" is an air gap between the lens having positive power and the lens having negative power along the optical axis direction, and "tG2" is a distance between an object-side surface of a lens closest to the object in the second lens group, and an image sensor-side surface of a lens closest to the image sensor along the optical axis direction in the second lens group.

According to an embodiment of the disclosure, an electronic device may include a processor and a lens assembly, wherein the lens assembly includes an image sensor configured to capture an image of an object, a first lens group disposed closest to an object in three lens groups sequentially arranged from the object toward an image sensor along an optical axis direction, the first lens group including multiple lenses and having negative power, a second lens group disposed to be moveable forward/backward along the optical axis direction between the image sensor and the first lens group, the second lens group having positive power, and a third lens group disposed to be moveable forward/backward along the optical axis direction between the image sensor and the second lens group, the third lens group including multiple lenses and having negative power, wherein the processor is configured to move the second lens group and/or the third lens group to the object side in a zooming operation so as to increase the focal length of the lens assembly, the second lens group includes a lens having negative power and a lens having positive power and is disposed adjacent to the lens having negative power on the object side, and the lens assembly is configured to satisfy the following [Condition formula 5]:

$$0.1 \leq G2\_/tG2 \leq 0.3 \qquad \text{[Condition formula 5]}$$

Wherein "G2_air" is an air gap between the lens having positive power and the lens having negative power along the optical axis direction, and "tG2" is a distance between an object-side surface of a lens closest to the object in the second lens group, and an image sensor-side surface of a lens closest to the image sensor along the optical axis direction in the second lens group.

Additional aspects will be set forth in part in the description which follows and, in part, will be apparent from the description, or may be learned by practice of the presented embodiments.

BRIEF DESCRIPTION OF THE DRAWINGS

Aspects described above in connection with certain embodiments disclosed in the document, other aspects, configurations, and/or advantages may become clearer from the following detailed descriptions with reference to the accompanying drawings.

Throughout the accompanying drawings, similar reference numbers may be assigned to similar components, configurations, and/or structures.

DETAILED DESCRIPTION

Certain embodiments of the instant disclosure at least solve the above-mentioned problems and/or shortcomings and at least provide the advantages described below, and may provide a lens assembly which is compact while implementing a zoom function and/or an electronic device including the same.

According to certain embodiments of the disclosure, a lens assembly may be easily made compact. While the lens closest to the object remains still, the lens assembly may implement zoom function by using its second or third closest lens group. For example, the same may be easily mounted on a compact and/or lightweight electronic device such as a smartphone, thereby contributing to expansion or improvement of the optical function of the electronic device. Certain other advantages identified explicitly or implicitly through the disclosure may be provided.

The following descriptions with reference to the accompanying drawings may be provided to assist in a comprehensive understanding of various implementations the disclosure defined by the claims and their equivalents. The specific embodiments disclosed in the following descriptions include various specific details for helping understanding, but may be regarded as one of various embodiments. Accordingly, it is obvious to a person skilled in the art that various changes and modifications of the various implementations disclosed in the document may be made without departing from the technical idea and scope of the disclosure. In addition, descriptions of well-known functions and configurations may be omitted for clarity and conciseness.

The terms and words used in the following descriptions and claims may not be limited to the bibliographical meanings, and may be used to clearly and consistently describe the various embodiments disclosed in the document. Accordingly, it should be obvious to a person skilled in the art that the following descriptions for various implements of the disclosure are provided for an explanation purpose only and not for the purpose that the claims and their equivalents is limited by the disclosure.

It should be understood that the singular forms "a", "an", and "the" include plural referents unless the context clearly dictates otherwise. Therefore, for example, it may mean that the term "the surface of an element" includes one or more of the surfaces of the element.

Figure 1:
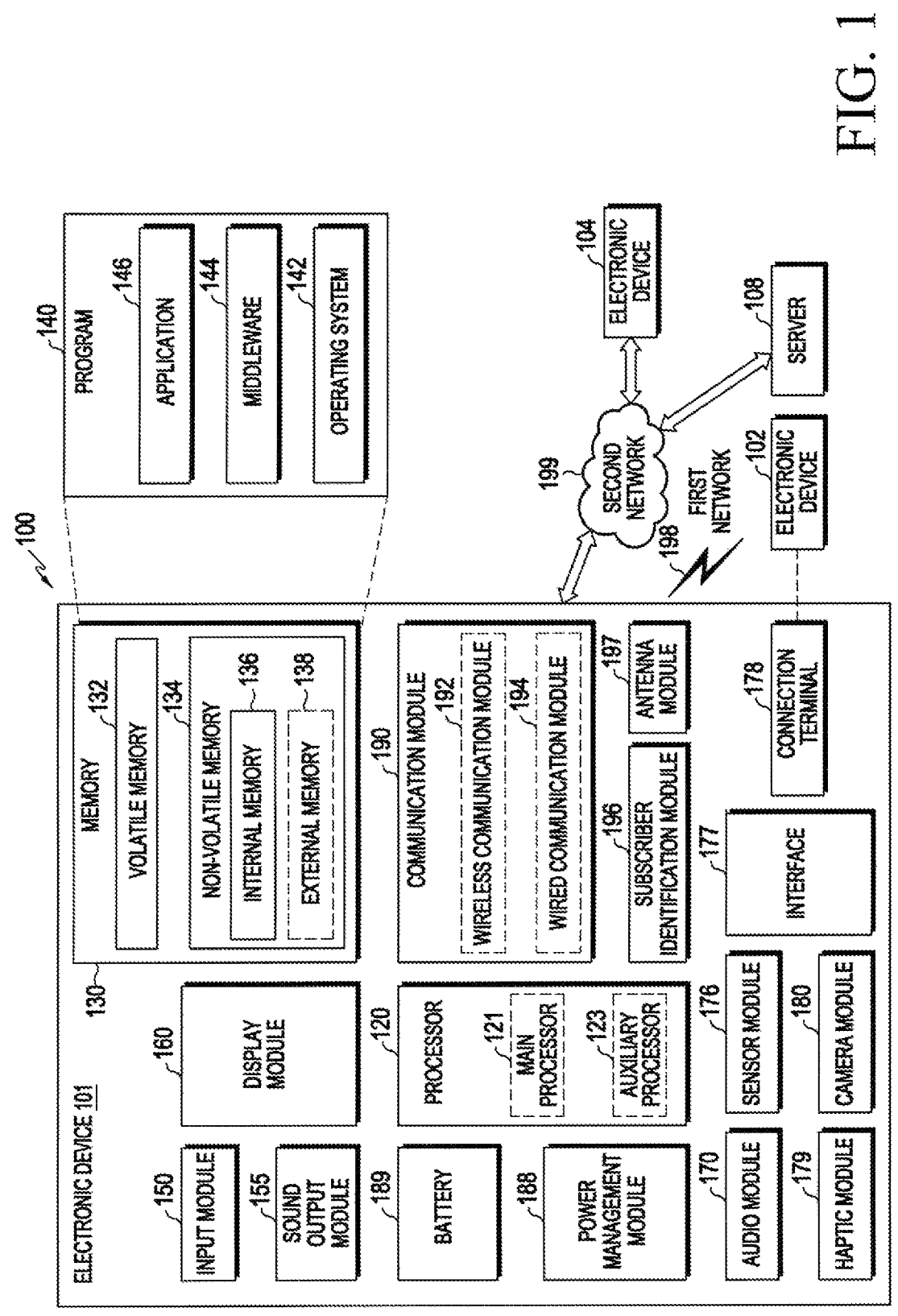
FIG. 1 is a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory includes internal memory 136 and external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi™) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed descriptions, the longitudinal direction, the width direction, and/or the thickness direction of the electronic device may be mentioned, the longitudinal direction may be defined as the "Y-axis direction." the width direction may be defined as the "X-axis direction," and/or the thickness direction may be defined as the "Z-axis direction," as shown in for example FIG. 2. In some embodiments, in connection with the direction to which an element is disposed, in addition to the orthogonal coordinate system illustrated in the drawings. "negative/positive (−/+)" may be mentioned together. For example, the front surface of the electronic device or its housing may be defined as "a surface facing the +Z direction." and the rear surface thereof may be defined as "a surface facing the −Z direction." In some embodiments, the side surface of the electronic device or its housing may include an area facing the +X direction, an area facing the +Y direction, an area facing the −X direction, and/or an area facing the −Y direction. In another embodiment, "the X-axis direction" may include both "the −X direction" and "the +X direction". The foregoing is based on the orthogonal coordinate system illustrated in the drawings for the sake of brevity of description, and it should be noted that the directions or descriptions of elements do not limit the various embodiments of the disclosure.

Figure 2:
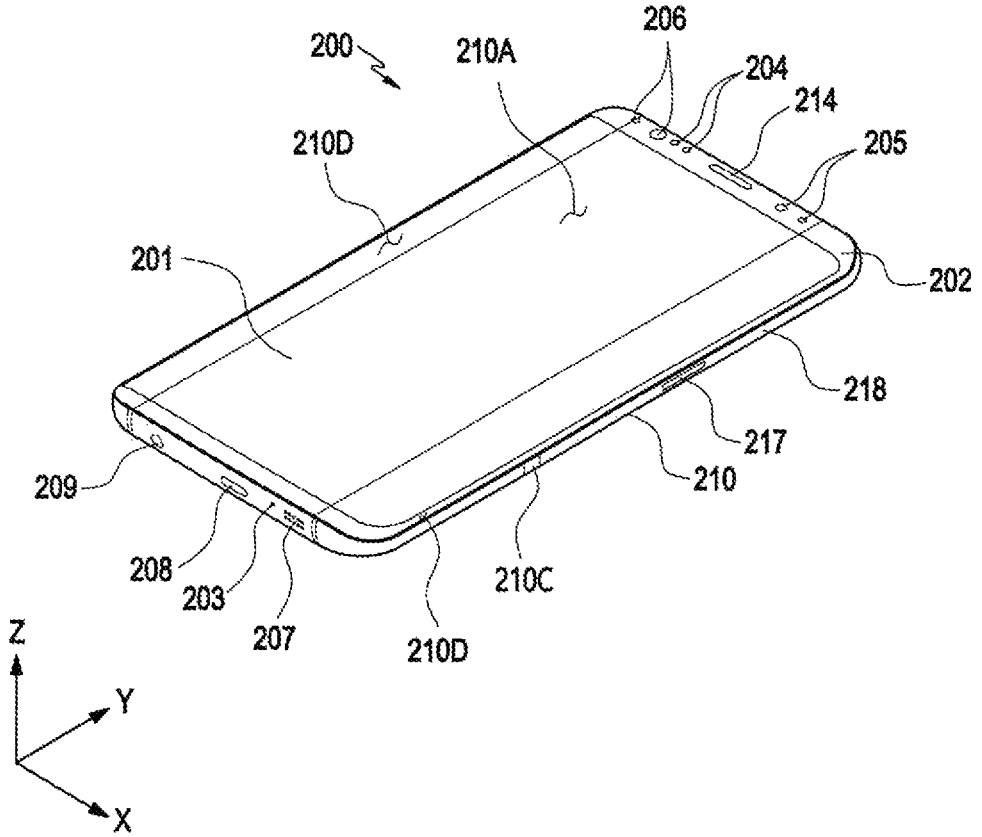
FIG. 2 is a perspective view showing the front surface of an electronic device according to various embodiments of the disclosure.
Figure 3:
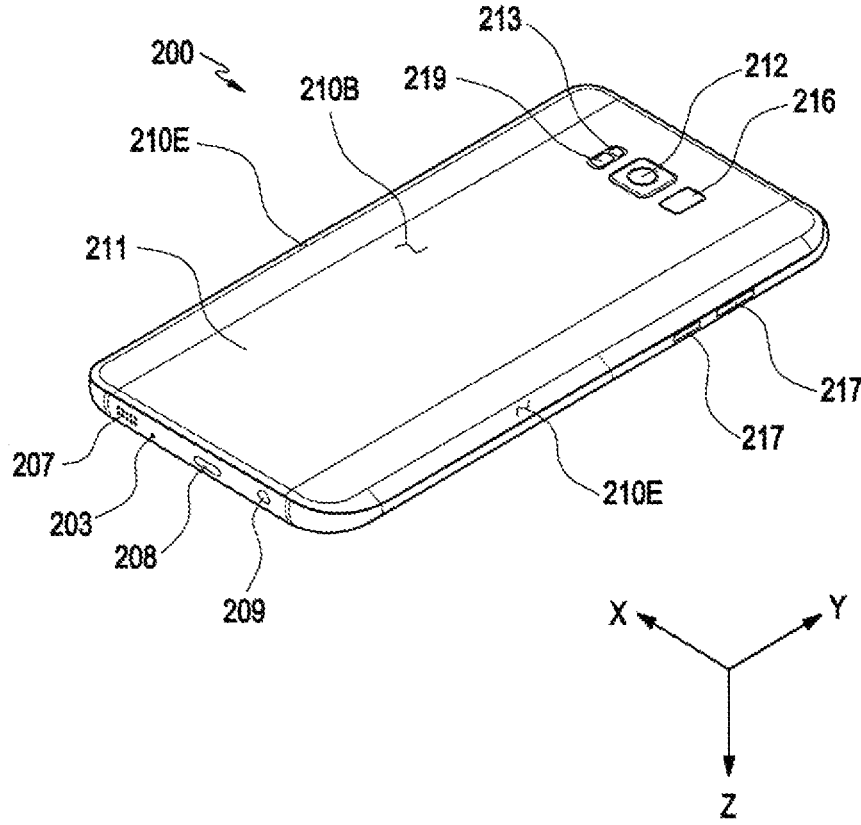
FIG. 3 is a perspective view showing the rear surface of the electronic device illustrated in FIG. 2.

FIG. 2 is a perspective view showing the front surface of an electronic device 200 (e.g., the electronic device 101 of FIG. 1) according to an embodiment of the disclosure. FIG. 3 is a perspective view showing the rear surface of the electronic device 200 illustrated in FIG. 2.

Referring to FIGS. 2 and 3, an electronic device 200 according to an embodiment may include a first surface 210A (or front surface), a second surface 210B (or rear surface), and a housing 210 including a side surface 210C configured to surround the space between the first surface 210A and the second surface 210B. In another embodiment (not shown), the housing may be referred to as a structure that implements at least a part of the first surface 210A, the second surface 210B, and the side surface 210C of FIG. 2. According to an embodiment, the first surface 210A may be implemented by a front plate 202 (e.g., glass plate including various coating layers, or a polymer plate) of which at least a portion is substantially transparent. The second surface 210B may be implemented by a substantially opaque rear plate 211. For example, the rear plate 211 may be made of coated or colored glass, ceramic, polymer, metal (e.g., aluminum, stainless steel (STS), or magnesium), or a combination of at least two of the above materials. The side surface 210C may be coupled to the front plate 202 and the rear plate 211, and may be implemented by a side-surface structure 218 including metal and/or polymer. In some embodiments, the rear plate 211 and the side-surface structure 218 may be integrated together, and may include the same materials (e.g., metal material such as aluminum).

In the illustrated embodiment, the front plate 202 may include two first areas 210D which are configured to be bent from the first surface 210A toward the rear plate 211 and to extend seamlessly and are provided at the ends of the longitudinal edges of the front plate 202. In the illustrated embodiment (see FIG. 3), the rear plate 211 may include two second areas 210E which are configured to be bent from the second surface 210B toward the front plate 202 and to extend seamlessly and are provided at the ends of the longitudinal edges thereof. In some embodiments, the front plate 202 (or the rear plate 211) may include only one of the first areas 210D (or the second areas 210E). That is, in other embodiments, some of the first areas 210D or the second areas 210E may not be included therein. In certain embodiments, when seen from the side surface of the electronic device 200, the side-surface structure 218 may have a first thickness (or width) in the side-surface side not including the first areas 210D or the second areas 210E, and may have a second thickness thinner than the first thickness in the side-surface side including the first areas 210D or the second areas 210E.

According to an embodiment, the electronic device 200 may include at least one of s a display 201 (e.g., the display module 160 of FIG. 1), audio modules 203, 207, and 214 (e.g., the audio module 170 of FIG. 1), sensor modules 204, 216, and 219 (e.g., the sensor module 176 of FIG. 1), camera modules 205, 212, and 213 (e.g., the camera module 180 of FIG. 1), a key input device 217 (e.g., the input module 150 of FIG. 1), a light-emitting element 206, and connector holes 208 or 209. In some embodiments, at least one (e.g., the key input device 217 or the light-emitting element 206) of the elements may be omitted from the electronic device 200, or other elements may be additionally included therein.

For example, the display 201 may be exposed through a substantial portion of the front plate 202. In some embodiments, at least a part of the display 201 may be exposed through the front plate 202 configured to form the first surface 210A and the first areas 210D of the side surface 210C. In some embodiments, the edges of the display 201 may have substantially the same shape as the periphery of the front plate 202 adjacent thereto. In another embodiment (not shown), in order to maximize the active area of the display 201, the gap between the outer perimeter of the display 201 and the outer perimeter of the front plate 202 may be substantially the same.

In another embodiment (not shown), a recess or an opening may be formed in a part of a screen display area of the display 201, and at least one of the audio module 214, the sensor module 204, the camera module 205, and the light-emitting element 206, which are aligned with the recess or the opening, may be included therein. In another embodiment, at least one of the audio module 214, the sensor module 204, the camera module 205, fingerprint sensor 216, and the light-emitting element 206 may be included on the rear surface of the screen display area of the display 201. In another embodiment (not shown), the display 201 may be coupled to or disposed adjacently to a touch detection circuit, a pressure sensor capable of measuring the intensity (pressure) of touches, and/or a digitizer for detecting a stylus pen of a magnetic field type. In some embodiments, at least a part of the sensor module 204 or 219, and/or at least a part of a key input device 217 may be disposed in the first areas 210D and/or the second areas 210E.

The audio modules 203, 207, and 214 may include a microphone hole 203 and speaker holes 207 and 214. A microphone for acquiring external sound may be disposed inside the microphone hole 203, and in some embodiments, multiple microphones may be arranged to detect the direction of sound. The speaker holes 207 and 214 may include an external speaker hole 207 and a receiver hole 214 for calling. In some embodiments, the speaker holes 207 and 214 and the microphone hole 203 may be implemented as one hole, or a speaker (e.g., piezo speaker) may be included therein without the speaker holes 207 and 214.

The sensor modules 204, 216, and 219 may be configured to generate electrical signal(s) or data value(s) corresponding to internal operation state(s) of the electronic device 200 or external environmental state(s). For example, the sensor modules 204, 216, and 219 may include a first sensor modules 204 (e.g., proximity sensor) and/or a second sensor module (not shown) (e.g., fingerprint sensor) arranged on the first surface 210A of the housing, and/or a third sensor module 219 (e.g., heart-rate monitor (HRM) sensor) and/or a fourth sensor module 216 (e.g., fingerprint sensor) arranged on the second surface 210B of the housing 210. The fingerprint sensor may be disposed on not only the first surface 210A (e.g., the display 201) of the housing 210 but also the second surface 210B. The electronic device 200 may further include at least one of the sensor module 176 of FIG. 1, such as a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, and a second camera device 212 and/or flash 213 disposed on the second surface 210B. The camera devices 205 and 212 each may include one lens or multiple lenses, an image sensor, and/or an image signal processor. For example, the flash 213 may include a light-emitting diode or a xenon lamp. In some embodiments, two or more lenses (an infrared camera, a wide-angle lens, and/or a telephoto lens) and image sensors may be arranged on one surface of the electronic device 200.

The key input device 217 may be disposed on the side surface 210C of the housing 210. In another embodiment, the electronic device 200 may not include a part or the entirety of key input device 217 mentioned above, and the key input device 217 not included therein may be implemented, on the display 201, as a different type such as a soft key. In some embodiments, the key input device 217 may include the sensor module 216 disposed on the second surface 210B of the housing 210.

For example, the light-emitting element 206 may be disposed on the first surface 210A of the housing 210. For example, the light-emitting element 206 may be configured to provide state information of the electronic device 200 optically. In another embodiment, for example, the light-emitting element 206 may be configured to provide a light source interworking with the camera module 205. For example, the light-emitting element 206 may include an LED (Light Emitting Diode), an IR LED, and a xenon lamp.

The connector holes 208 and 209 may include a first connector holes 208 capable of accommodating a connector (for example, USB connector) for transmitting and receiving power and/or data to and from an external electronic device, and/or a second connector hole 209 (for example, earphone jack) capable of accommodating a connector for transmitting and receiving audio signals to and from an external electronic device.

Figure 4:
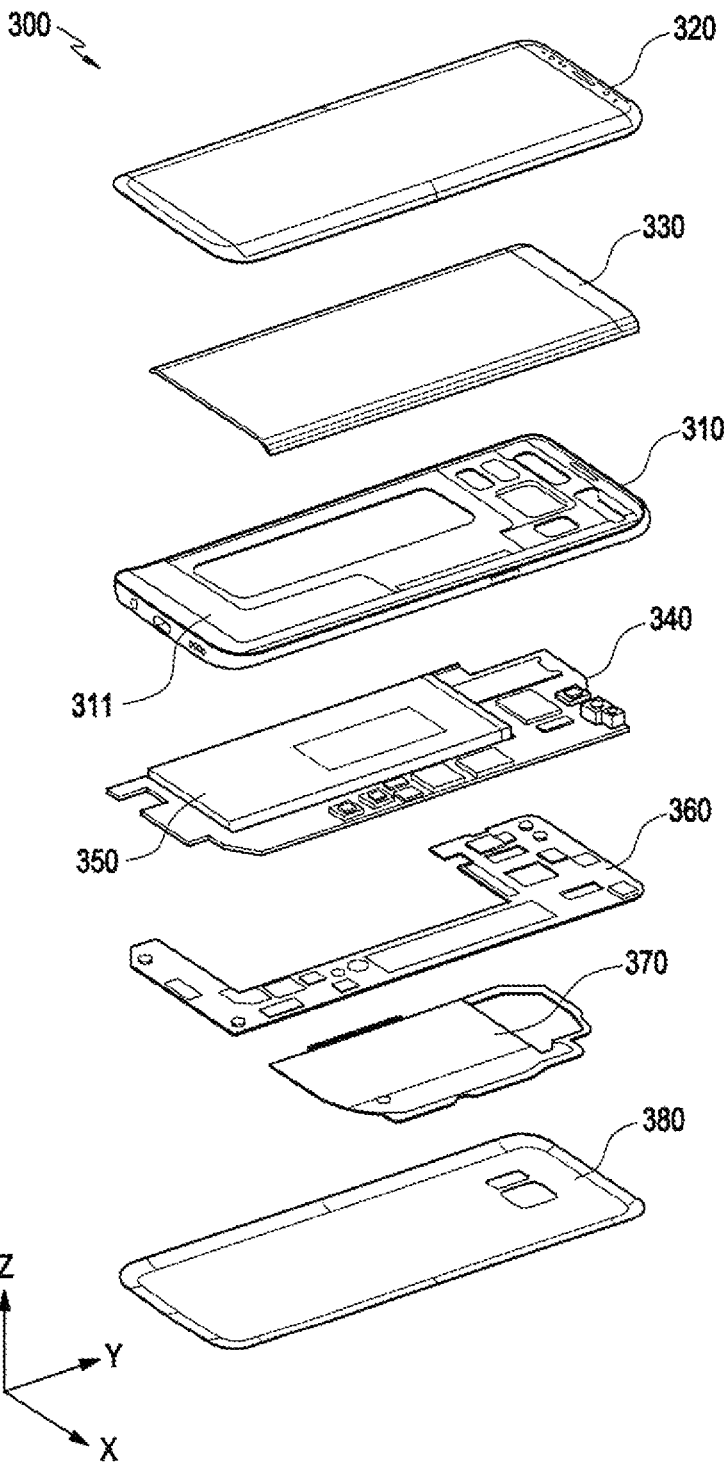
FIG. 4 is an exploded perspective of the electronic device illustrated in FIG. 2.

FIG. 4 is an exploded perspective of the electronic device 200 illustrated in FIG. 2.

Referring to FIG. 4, an electronic device 300 (e.g., the electronic device 101 or 200 of FIG. 1 to FIG. 3) may include a side-surface structure 310 (e.g., the side surface 210C of FIG. 2), a first support member 311 (e.g., bracket), a front plate 320, a display 330 (e.g., the display module 160 of FIG. 1 or the display 201 of FIG. 2), a printed circuit board 340 (e.g., printed circuit board (PCB), printed board assembly (PBA), flexible PCB (FPCB), or rigid-flexible PCB (RFPCB)), a battery 350 (e.g., the battery 189 of FIG. 1), a second support member 360 (e.g., rear case), an antenna 370, and a rear plate 380. In some embodiments, at least one (e.g., the first support member 311 or the second support member 360) of elements may be omitted from the electronic device 300, or other elements may be additionally included therein. At least one of elements of the electronic device 300 may be the same as or similar to the corresponding elements of the electronic device 200 of FIG. 2 or FIG. 3, and duplicative descriptions will be omitted hereinafter.

The first support member 311 may be disposed inside the electronic device 300 to be connected to the side-surface structure 310 or to be integrated with the side-surface structure 310. For example, the first support member 311 may be made of metal material and/or non-metal (e.g., polymer) material. The first support member 311 may have one surface to which the display 330 is coupled and the other surface to which the printed circuit board 340 is coupled. The printed circuit board 340 may have a processor (e.g., the processor 120 of FIG. 1), a memory (e.g., the memory 130 of FIG. 1), and/or an interface (e.g., the interface 177 of FIG. 1) which are mounted thereon. For example, the processor may include one or more of a central processing unit, an application processor, a graphic processing unit, an image signal processor, a sensor hub processor, or a communication processor.

For example, the memory may include a volatile memory or a non-volatile memory.

For example, the interface may include a high definition multimedia interface (HDMI), a universal serial bus (USB) interface, an SD card interface, and/or an audio interface. For example, the interface may be configured to electrically or physically connect the electronic device 300 to an external electronic device, and may include a USB connector, an SD card/MMC connector, or an audio connector.

The battery 350 may be a device configured to supply power to at least one element of the electronic device 300, and for example, may include a non-rechargeable primary cell, a rechargeable secondary cell, or a fuel cell. For example, at least a part of the battery 350 may be disposed on substantially the same plane as the printed circuit board 340. The battery 350 may be integrally disposed inside the electronic device 300, or may be disposed to be user-detachable/attachable from/to the electronic device 300.

The antenna 370 may be disposed between the rear plate 380 and the battery 350. For example, the antenna 370 may include a near field communication (NFC) antenna, a wireless charging antenna, and/or a magnetic secure transmission (MST) antenna. For example, the antenna 370 may be configured to perform short-range communication with an external device, or may be configured to transmit/receive a power required for charging wirelessly. In another embodiment, an antenna structure may be formed by a part of the side-surface structure 310 and/or the first support member 311, or a combination thereof.

In the following detailed descriptions, the electronic device 101, 200, or 300 of the precedent embodiments may be referenced, and it should be noted that in the following description, elements that are the same or similar to the elements shown in the precedent embodiments may be given the same reference numerals or the reference numerals may be omitted, and duplicative descriptions thereof may also be omitted.

Figure 5:
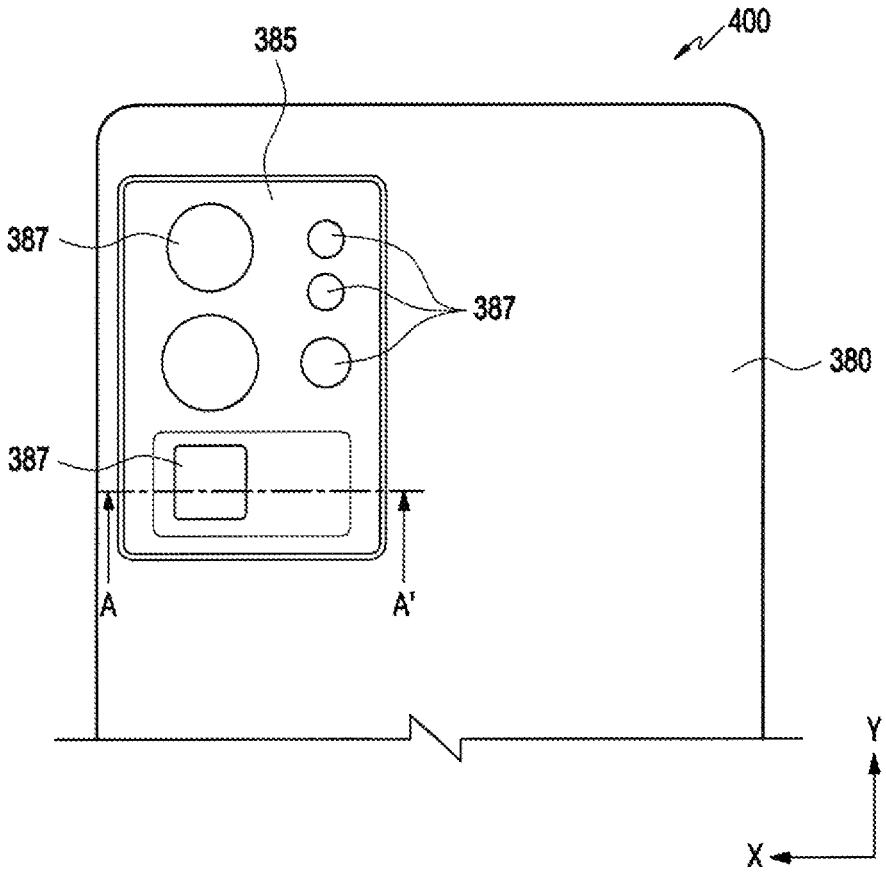
FIG. 5 is a plan view showing the rear surface of an electronic device according to an embodiment of the disclosure.
Figure 6:
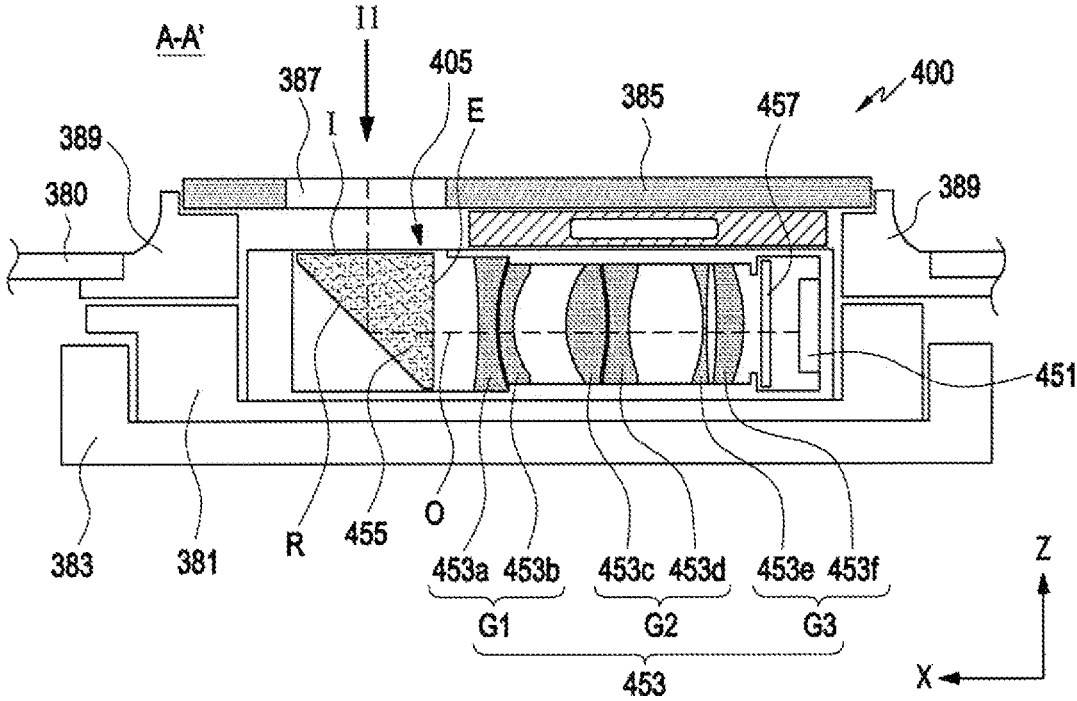
FIG. 6 is a cross-sectional view showing a portion of the electronic device, which is cut along the line A-A' of FIG. 5.

FIG. 5 is a plan view showing the rear surface of an electronic device 400 (e.g., the electronic device 101, 200, or 300 of FIG. 1 to FIG. 4) according to an embodiment of the disclosure. FIG. 6 is a cross-sectional view showing a portion of the electronic device 400, which is cut along the line A-A' of FIG. 5.

Referring to FIG. 5 and FIG. 6, the electronic device 400 according to an embodiment of the disclosure may include a camera window 385 disposed on one surface (e.g., the second surface 210B of FIG. 3). In some embodiments, the camera window 385 may be a part of the rear plate 380. In one embodiment, the camera window 385 may be coupled to the rear plate 380 through a decoration member 389, and when seen from the outside, the decoration member 389 may be configured to be exposed while surrounding the perimeter of the camera window 385. According to one embodiment, the camera window 385 may include multiple transparent areas 387, and the electronic device 400 may be configured to receive external light or emit light to the outside of the device through at least one of the transparent areas 387. For example, the electronic device 400 may include at least one camera module 405 (e.g., the camera module 180, 205, 212, or 213 of FIG. 1 to FIG. 3) disposed to correspond to at least a part of the transparent areas 387, and at least one light source (e.g., infrared light source) disposed to correspond to another part of the transparent areas 387. For example, the camera module or the light source may be configured to receive external light or emit light to the outside of the electronic device 400 through one of the transparent areas 387.

According to an embodiment, the electronic device 400 may include, as the camera module 405 or a light-receiving element, at least one lens assembly such as a wide-angle camera, an ultra-wide-angle camera, a close-up camera, and a telephoto camera, or an infrared photodiode, and may include a flash (e.g., the flash 213 of FIG. 3) or an infrared laser diode as a light source or light-emitting element. In some embodiments, the electronic device 400 may be configured to emit an infrared laser toward a subject and receive the infrared laser reflected by the subject by using the infrared laser diode and the infrared photodiode, and thus detect the distance or depth to the subject. In another embodiment, the electronic device 400 may be configured to acquire images of the subject by using at least one of the lens assemblies, for example, the camera modules 405, and to provide light toward the subject by using a flash as necessary.

According to an embodiment, the wide-angle camera, the ultra-wide camera, or the close-up camera of the camera module may have smaller lengths in the direction of the optical axis O when compared to the telephoto camera (e.g., the camera module 405). For example, the telephoto camera (e.g., the camera module 405) requiring a relatively large adjustment range for focal length may need a sufficient length or space in the direction of the optical axis O so as to allow movement of the lens(es) 453. In one embodiment, although the lens(es) of the wide-angle camera, the ultra-wide-angle camera, or the close-up camera is arranged along the thickness direction (e.g., in the Z-axis direction of FIG. 4 or FIG. 6) of the electronic device 400, the influence of the thickness thereof on the thickness of the electronic device 400 may be substantially small. For example, the wide-angle camera, the ultra-wide-angle camera, or the close-up camera may be arranged in the electronic device 400 such that the direction in which light is incident from the outside to the electronic device 400, and the direction of the optical axis of the lens(es) are substantially the same. In another embodiment, when compared to the wide-angle camera, the ultra-wide-angle camera, or the close-up camera, the camera module 405 (e.g., telephoto camera) may be configured to have a small field of view, but may be useful for photographing subjects that are relatively far away and may include more lens(es) 453 or may be configured such that the movement distance of the lens(es) 453 is greater to allow for adjustment of the focal length thereof. For example, when the lens(es) 453 of the camera module 405 is disposed in the thickness direction (e.g., the Z-axis direction) of the electronic device 400, the thickness of the electronic device 400 may be increased, or the camera module 405 may have a substantial portion protruding to the outside of the electronic device 400.

According to an embodiment, the camera module 405 may be implemented as folded camera, such that it would further include a reflection member 455 (e.g. prism), and thus the direction (e.g., the direction of the optical axis O of FIG. 6) in which the lens(es) 453 is disposed, may intersect the direction (e.g., the incidence direction I1 of FIG. 6) in which external light is incident. For example, the reflection member 455 may be disposed in on object side of a first lens group G1 so as to refract or reflect light incident from the outside and thus guide light to the arrangement direction of the lens(es) 453 or an image sensor 451.

According to an embodiment, the reflection member 455 may include an incident surface I facing the outside of the device, an emission surface E facing the lens 453, and/or a reflective surface R inclined with respect to the incident surface I (or the emission surface E). For example, external light may be incident through the incident surface I and then may be reflected by the reflective surface R, and the reflected light may travel toward the lens 453 or the image sensor 451 through the emission surface E. Depending on the shape or size, the electronic device 400 may not include the reflection member 455, and when the reflection member 455 is not included therein, the incidence direction I1 may be substantially parallel to or coincide with the direction of the optical axis O.

According to an embodiment, the incidence direction I1 may be substantially parallel to the thickness direction (e.g., the Z-axis direction) of the electronic device 400, and the arrangement direction of the lens(es) 453 may intersect the incidence direction I1. The arrangement direction of the lens(es) 453 may be the direction in which light refracted or reflected by the reflection member 455 travels. In some embodiments, the arrangement direction of the lens(es) 453 or the direction of the optical axis O may be substantially perpendicular to the incidence direction I1, and may be parallel to the width direction (e.g., the X-axis direction of FIG. 4) or the longitudinal direction (e.g., the Y-axis direction of FIG. 4) of the electronic device 400 or its housing (e.g., the housing 210 of FIG. 2).

The lens assembly or the camera module 405 illustrated in FIG. 6 may for example include a folded camera or a telephoto camera, and the lens(es) 453 may be arranged to be moveable forward/backward along the width direction (e.g., the direction parallel to the X-axis or the direction of the optical axis O) of the electronic device 400. According to one embodiment, the camera module 405 may include the reflection member 455 configured to receive and then refract or reflect external light, the lens(es) 453 configured to focus light refracted or reflected by the reflection member 455, and/or the image sensor 451 aligned on the optical axis O of lens(es) 453. For example, the image sensor 451 may be configured to receive external light through the reflection member 455 and the lens(es) 453. In some embodiments, external light may be incident to the reflection member 455 along the incidence direction I1, and may be reflected or refracted by the reflection member 455 and then may be guided to the image sensor 451 along the direction of the optical axis O. For example, the lens(es) 453 may be configured to focus or guide light reflected or refracted by the reflection member 455 to the image sensor 451.

According to an embodiment, for example, the reflection member 455 may be a prism, and may be configured to reflect or refract light, which has been incident from the incidence direction I1, to a direction (e.g., the direction of the optical axis O) substantially perpendicular to the incidence direction I1. Although the example of FIG. 6 shows the incidence direction I1 and the direction of the optical axis O are substantially perpendicular, embodiments of the disclosure may not be limited thereto. For example, the angle at which the incidence direction I1 and the direction of the optical axis O intersect with each other may vary according to the structure of the electronic device 400 or its housing (e.g., the housing 210 of FIG. 2).

According to an embodiment, the camera module 405 may include multiple lenses 453 which are sequentially arranged from an object (e.g., the object obj of FIG. 8) side to the image sensor 451 along the direction of the optical axis O. In the illustrated embodiment, the first lens group G1 may include a first lens 453a and a second lens 453b, a second lens group G2 may include a third lens 453c and a fourth lens 453d, and/or a third lens group G3 may include a fifth lens 453e and a sixth lens 453f. In one embodiment, the incidence direction I1 may be parallel to the thickness direction (e.g., the Z-axis direction) of the electronic device 400, and the direction of the optical axis O may be parallel to the width direction (e.g., the X-axis direction) or the longitudinal direction (e.g., the Y-axis direction) of the electronic device 400.

Although FIG. 6 illustrates a configuration in which the camera module 405 includes six lenses 453, the configuration is intended to exemplify a configuration in which one lens group G1, G2, or G3 includes multiple lenses, and thus it should be noted that embodiments of the disclosure are not limited thereto. For example, the number of lenses included in each of the lens groups G1, G2, and G3 may vary, as long as the conditions presented through the embodiments of the instant disclosure are satisfied. These embodiments will be further described through the embodiments of FIG. 7 to FIG. 27C.

According to an embodiment, the lens(es) 453 may be made of a synthetic resin material so that they can be freely designed to have various sizes or shapes. The resolving powers of the lens(es) 453 made of the synthetic resin material may vary depending on temperature or humidity, and the change in resolving power of a lens assembly or camera module 405 having a long focal length may be greater than that of a standard camera or a wide-angle camera. According to certain embodiments, in order to implement a telephoto function of the camera module 405, at least one of the lenses 453 of the first lens group G1 and/or at least one of the lenses of the second lens group G2 may be made of glass to suppress this change in resolving power caused by environmental conditions.

According to an embodiment, at least one of the lens groups G1, G2, and G3 may be configured to be moveable forward/backward along the direction of the optical axis O between the image sensor 451 and the reflection member 455. For example, at least one of the lens groups G1, G2, and G3 may be configured to perform a zoom function for adjusting the focal length or a focus adjustment function. In one embodiment, when the first lens 453a or the first lens group G1, which is disposed closest to the object, is visually exposed to the outside of the device, the first lens group G1 may be configured to be static, and the electronic device 400 or the processor 120 of FIG. 1 may be configured to perform focal length adjustment or focus adjustment by using the second lens group G2 and/or a third lens group G3. For example, the electronic device 400 or the processor 120 of FIG. 1 may be configured to move at least one of the second lens group G2 and the third lens group G3 forward or backward in the direction of the optical axis O so as to adjust the focal length thereof, and may be configured to move the second lens group G2 or the third lens group G3 forward or backward in the direction of optical axis O so as to perform focus adjustment. In some embodiments, the second lens group G2 and the third lens group G3 may be configured to be moved along the direction of the optical axis O together so as to adjust the focal length thereof, and one of the second lens group G2 and the third lens group G3 may be configured to be moved along the direction of the optical axis O with respect to the other thereof so as to perform focus adjustment.

Figure 7:
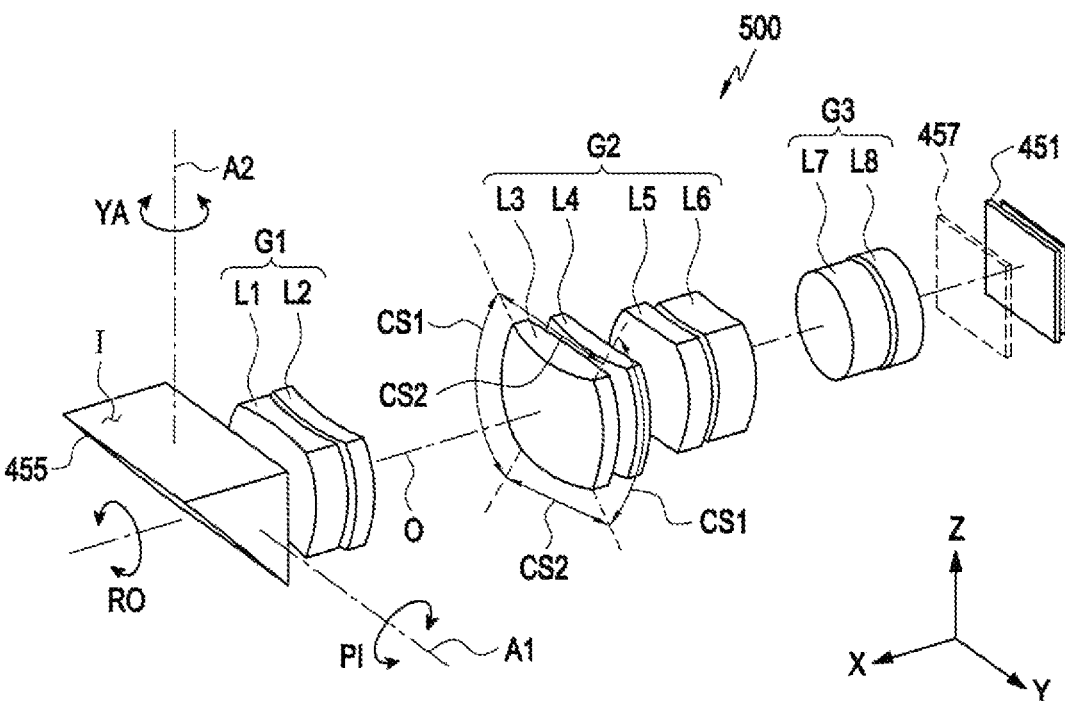
FIG. 7 is a perspective view showing a portion of a lens assembly according to an embodiment of the disclosure.

FIG. 7 is a perspective view showing a portion of a lens assembly 500 (e.g., the camera module 180 or 405 of FIG. 1 or FIG. 6) according to an embodiment of the disclosure.

Further referring to FIG. 7, the first lens group G1 of the lens groups G1, G2, and G3 may be disposed closest to the object, and may include at least two lenses L1 and L2 (e.g., the first lens 453a and the second lens 453b of FIG. 6) and may have negative power. In one embodiment, the (1-1)st lens L1 of the first lens group G1, which is disposed closest to the object, may have negative power, and the (1-2)nd lens L2 of the first lens group G1 may be disposed between the (1-1)st lens L1 and the image sensor 451 and may have positive power. In some embodiments, the (1-1)st lens L1 may have a surface at the object obj side that is concave or a surface at the image sensor 451 side that is concave, and the (1-2)nd lens L2 may have a surface at the object obj side that is convex. According to an embodiment, the first lens group G1 may further include at least one lens having a positive or negative power.

According to an embodiment, the second lens group G2 of the lens groups G1, G2, and G3 may include at least two lenses (e.g., the third lens 453c and the fourth lens 453d of FIG. 6), such as four lenses L3, L4, L5, and L6 and may have positive power, and may be disposed to be moveable forward/backward along the direction of the optical axis O between the first lens group G1 and the image sensor 451. For example, the second lens group G2 may be configured to be moveable forward/backward along the direction of the optical axis O so as to adjust the focal length or perform focus adjustment. According to one embodiment, when the second lens group G2 moves to the object obj side with respect to the first lens group G1 or the image sensor 451, the lens assembly 500 or the camera module 405 may be configured to have an increased focal length. In another embodiment (e.g., zoom-in), when the second lens group G2 moves towards the image sensor 451 with respect to the first lens group G1 or the image sensor 451, the lens assembly 500 or the camera module 405 may be configured to have a reduced focal length and an increased field of view (FOV) (e.g., zoom-out).

According to an embodiment, the second lens group G2 may include at least one lens having positive power and at least one lens having negative power, and the lens having positive power may be disposed at the object side of the lens having negative power while being adjacent to the lens having negative power. In one embodiment, the second lens group G2 may include four lenses L3, L4, L5, and L6 sequentially arranged from the object obj side to the image sensor 451. In the four lenses L3, L4, L5, and L6, the (2-1)st lens L3, which is disposed closest to the object obj side, may have positive power, the (2-2)nd lens L4, which is disposed next to L3, may have positive power, the (2-3)rd lens L5, which is disposed next to L4, may have negative power, and/or the (2-4)th lens L6, which is disposed next to L5, may have positive power In one embodiment, the lens assembly 500 or the second lens group G2 may be configured to satisfy the condition presented through the following [Mathematical equation 1].

$$0.1 \leq G2_{air}/tG2 \leq 0.3 \qquad \text{[Mathematical equation 1]}$$

Here, the "G2_air" may refer to an air gap between a lens1 among the lenses L3, L4, L5, and L6 of the second lens group G2 and a lens2 among the lenses L3, L4, L5, and L6 of the second lens group G2. According to an embodiment, on the optical axis O, the lens1 (e.g., the (2-3)rd lens L5) may have negative power and the lens2 (e.g., the (2-2)rd lens L4) may have positive power while being disposed at an object side of the lens1. In [Mathematical equation 1], the "tG2" may refer to the distance between a surface of the object obj side of the lens closest to the object in the second lens group G2, and the surface of the image sensor 451 side of the lens closest to the image sensor 451 in the second lens group G2, along the optical axis O. When the second lens group G2 includes the four lenses listed above, the "G2_air" may be the air gap between the (2-2)nd lens L4 and the (2-3)rd lens L5. When the second lens group G2 includes the four lenses L3, L4, L5, and L6 listed above, the "tG2" may be a distance between the object obj side surface of the (2-1)st lens L3 and the image sensor 451 side surface of the (2-4)th lens L6.

According to an embodiment, when exceeding the upper limit value of the condition presented in [Mathematical equation 1], in the lens assembly 500, spherical aberration and coma aberration may be well controlled, but astigmatic aberration may be large. In some embodiments, when below the lower limit value of the condition presented in [Mathematical equation 1], the spherical aberration of the lens assembly 500 may increase. For example, the lens assembly 500 may be configured to satisfy the condition presented in [Mathematical equation 1] so as to easily control aberration and have stable optical performance.

In one embodiment, the lens assembly 500 or the second lens group G2 may be configured to satisfy the condition presented through the following [Mathematical equation 2].

$$0.85 \leq f_{G2P}/f_{G2} \leq 1.25 \qquad \text{[Mathematical equation 2]}$$

Here, the "f_G2P" is the focal length of the lens closest to the image sensor 451 in the second lens group G2 (e.g., the (2-4)th lens L6), and the "f_G2" is the entire focal length of the second lens group G2.

According to an embodiment, when exceeding the upper limit value of the condition presented in [Mathematical equation 2], the coma aberration of the lens closest to the image sensor 451 in the second lens group G2 (e.g., the (2-4)th lens L6) may increase, and thus the sensitivity due to eccentricity between the lenses L1, L2, L3, and L4 in the second lens group G2 may increase. In some embodiments, when below the lower limit value of the condition presented in [Mathematical equation 2], the spherical aberration or the coma aberration by the lens closest to the object obj side in the second lens group G2 (e.g., the (2-1)st lens L3) may be easily controlled, but the spherical aberration, the coma aberration, and/or the astigmatic aberration of the lens having negative power (e.g., the (2-3)rd lens L5) may increase. For example, the lens assembly 500 may be configured to satisfy the condition presented in [Mathematical equation 2] so as to have stable optical performance.

In the embodiments of FIG. 8, FIG. 12, FIG. 16, FIG. 20, and/or FIG. 24 to be described later, a lens assembly and/or the second lens group G2 may be configured to have the following numerical values with respect to the condition presented through [Mathematical equation 1] or [Mathematical equation 2].

TABLE 1

Figure 8:
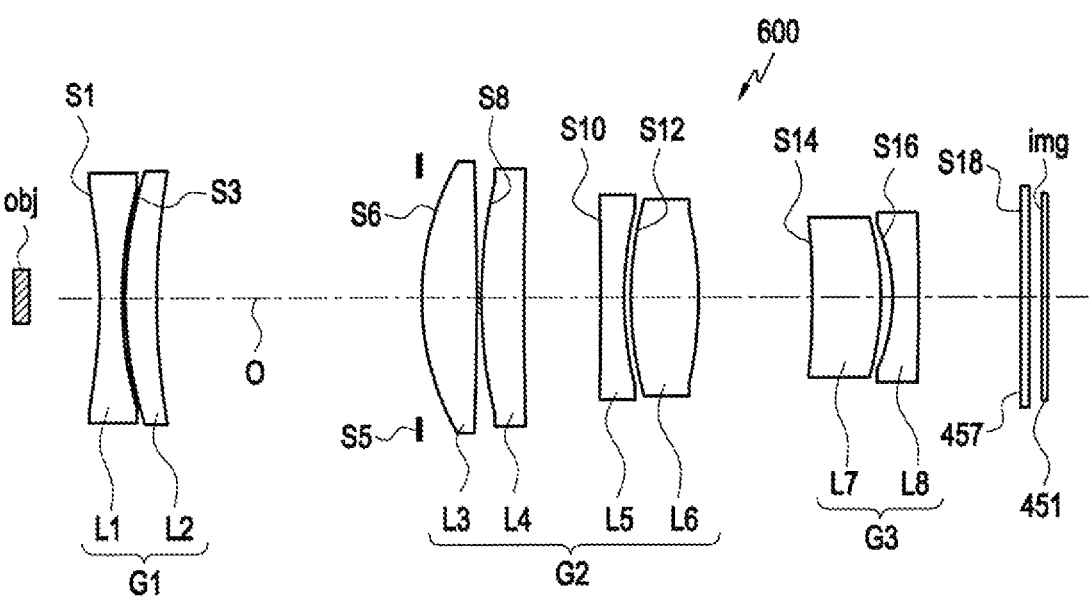
FIG. 8 is a view showing a lens (group) arrangement in a wide-angle end of a lens assembly according to an embodiment of the disclosure.
Figure 12:
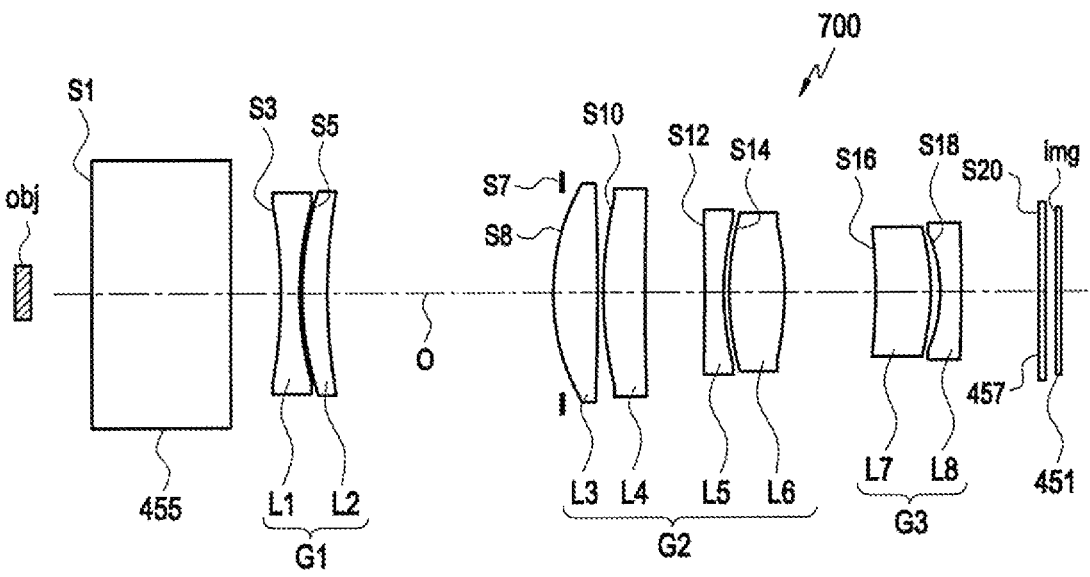
FIG. 12 is a view showing a lens (group) arrangement in a wide-angle end of a lens assembly according to an embodiment of the disclosure.
Figure 16:
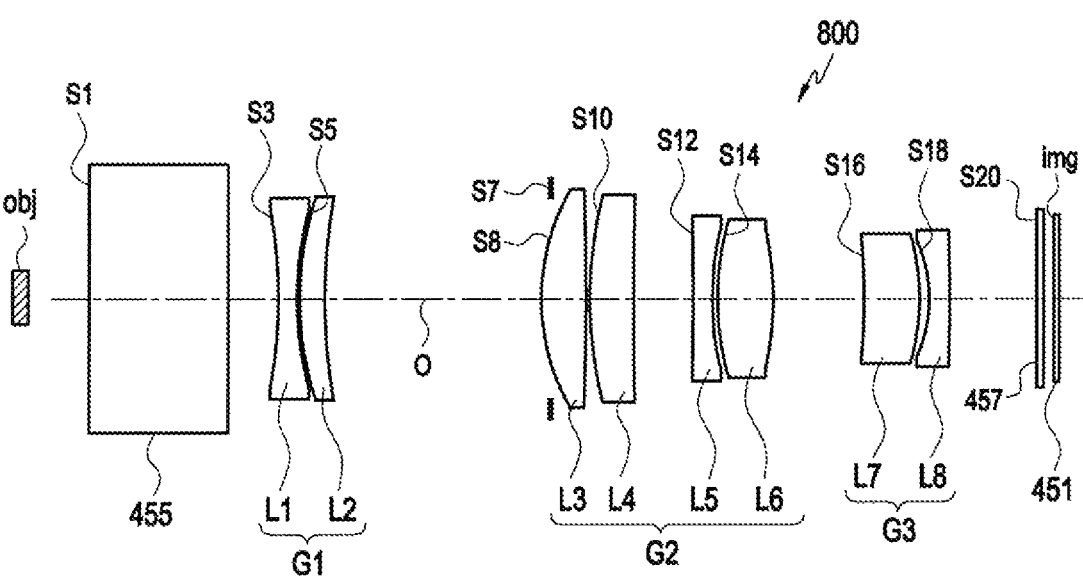
FIG. 16 is a view showing a lens (group) arrangement in a wide-angle end of a lens assembly according to an embodiment of the disclosure.
Figure 20:
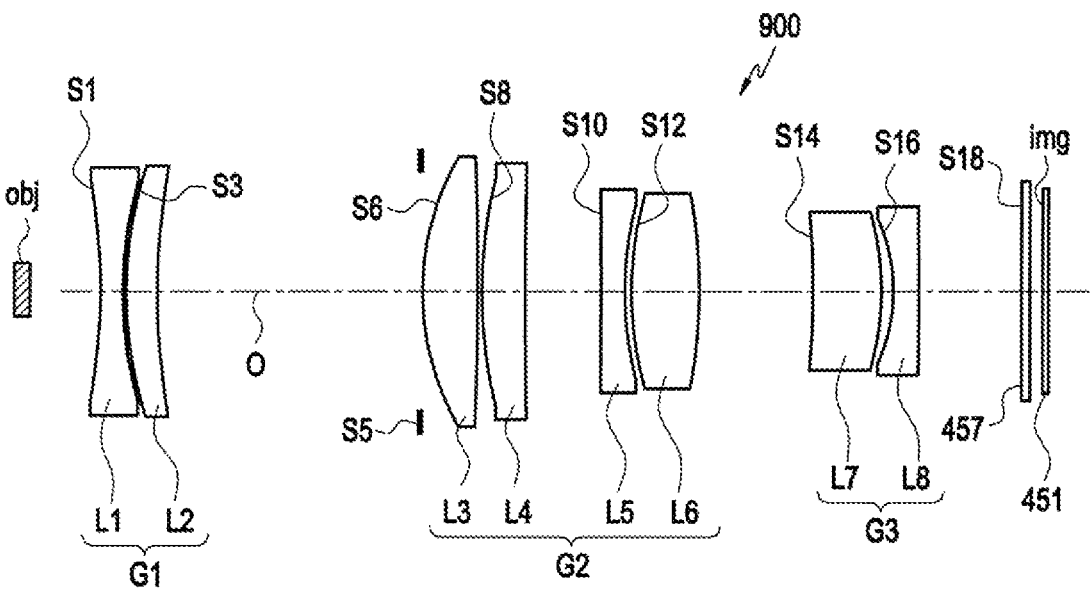
FIG. 20 is a view showing a lens (group) arrangement in a wide-angle end of a lens assembly according to an embodiment of the disclosure.
Figure 24:
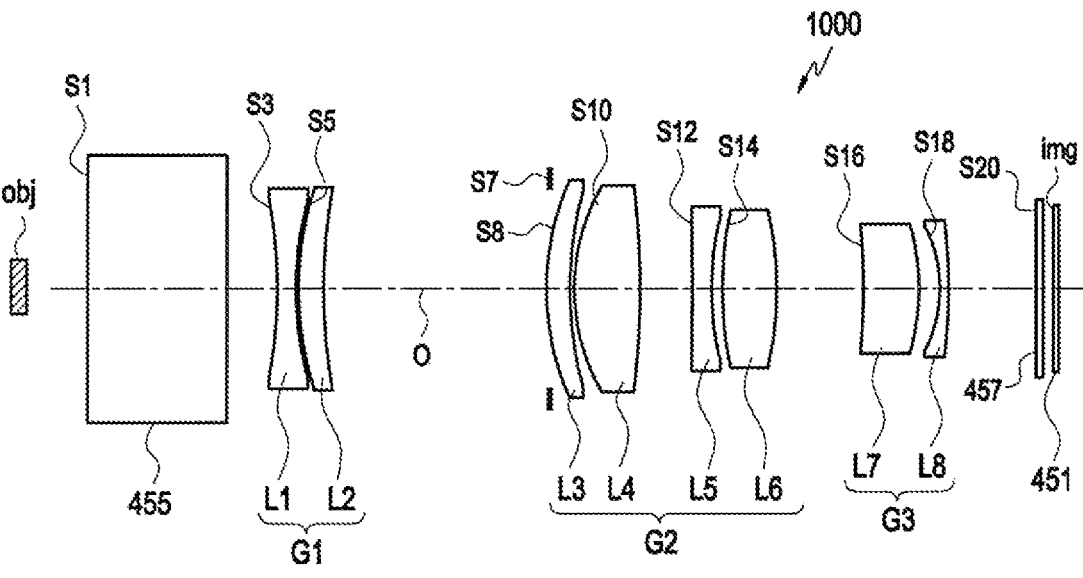
FIG. 24 is a view showing a lens (group) arrangement in a wide-angle end of a lens assembly according to an embodiment of the disclosure.

| Mathematical equation | Embodiment of FIG. 8 | Embodiment of FIG. 12 | Embodiment of FIG. 16 | Embodiment of FIG. 20 | Embodiment of FIG. 24 |
|---|---|---|---|---|---|
| G2_air/tG2 | 0.272 | 0.246 | 0.200 | 0.183 | 0.149 |
| f_G2P/f_G2 | 1.064 | 1.073 | 0.943 | 0.916 | 0.910 |

According to an embodiment, the third lens group G3 of the lens groups G1, G2, and G3 may include two lenses L7 and L8 (e.g., the fifth lens 453e and the sixth lens 453f of FIG. 6) and may have negative power, and may be configured to be moveable forward/backward between the second lens group G2 and the image sensor 451 along the direction of the optical axis O. For example, the third lens group G3 may be configured to be moveable forward/backward along the direction of the optical axis O so as to perform focus adjustment or adjust the focal length. According to one embodiment, the third lens group G3 may include a (3-1)st lens (L7) which has positive power and is disposed at the object obj side, and a (3-2)nd lens L8 which has negative power and is disposed at the image sensor 451 side. In some embodiments, when zooming, the third lens group G3 may be configured to move toward the object obj side together with the second lens group G2 so as to adjust the focal length of the lens assembly 500. In another embodiment, the third lens group G3 may be configured to move along the direction of the optical axis O together with the second lens group G2 so as to adjust the focal length, and to move along the direction of the optical axis O with respect to the second lens group G2 so as to perform focus adjustment. In another embodiment, the second lens group G2 may be configured to move along the direction of the optical axis O together with the third lens group G3 so as to adjust the focal length, and to move along the direction of the optical axis O with respect to the third lens group G3 so as to perform focus adjustment.

According to an embodiment, the lens assembly 500 or the camera module 405 may further include an infrared blocking filter 457 disposed between the third lens group G3 and the image sensor 451. Infrared rays are not visible to the naked eye, but may be detected by photosensitive film or the image sensor 451. The infrared blocking filter 457 may be configured to block infrared rays incident to the image sensor 451, thereby reducing or preventing deterioration of image quality.

According to an embodiment, the lens assembly 500 may further include an aperture (e.g., the surface indicated by "S5" of FIG. 8), and at least one of the lenses L1, L2, L3, L4, L5, L6, L7, and L8 or the aperture may be configured to have a non-circular shape. For example, at least one of the lenses L1, L2, L3, L4, L5, L6, L7, and L8 and/or the aperture may have an elliptical shape, or a shape (e.g., D-cut shape) that is approximately circular, but has an edge of which at least a part is straight. According to one embodiment, the aperture may be disposed between the lens (e.g., the (1-1)st lens L1) closest to the object in the first lens group G1, and the lens (e.g., the (2-4)th lens L6) closest to the image sensor 451 in of the second lens group G2. In an embodiment to be described later, the aperture is disposed at the object side of the second lens group G2. For example, the aperture is disposed between the first lens group G1 and the second lens group G2.

According to an embodiment, as mentioned above, the lens(es) L1, L2, L3, L4, L5, L6, L7, and L8 or the aperture may have an elliptical shape or a D-cut shape. For example, the lens(es) L1, L2, L3, L4, L5, L6, L7, and L8 or the aperture may have an effective diameter of an elliptical shape or a D-cut shape that is not a circular shape. In one embodiment, the edge of the lens(es) L1, L2, L3, L4, L5, L6, L7, and L8 or the aperture may be configured to have one pair of first curve sections CS1 and one pair of second curve sections CS2 having curvature (or curvature radius) which is at least partially different from that of the first curve sections CS1. Here, "the edge of the lens(es) L1, L2, L3, L4, L5, L6, L7, and L8 or the aperture" may mean the edge of the effective diameter, through which light to be incident to the image sensor 451 would pass. The first curve sections CS1 and the second curve sections CS2 may be alternately arranged along the edge of the effective diameter, so that the edge of the effective diameter may be implemented substantially by the first curve sections CS1 and the second curve sections CS2. In some embodiments, when the lens(es) L1, L2, L3, L4, L5, L6, L7, and L8 or the aperture has the D-cut shape, the second curve sections CS2 may have straight lines in which the curvature thereof is zero and the curvature radius thereof is infinite.

According to an embodiment, the lens(es) L1, L2, L3, L4, L5, L6, L7, and L8 or the aperture may have a shape corresponding to the aspect ratio of the image sensor 451. According to one embodiment, the lens(es) L1, L2, L3, L4, L5, L6, L7, and L8 or the aperture may be configured to provide an effective diameter having a first length corresponding to the horizontal length of the image sensor 451 and a second length corresponding to the vertical length of the image sensor 451. In one embodiment, for example, the second length may be a length measured in the vertical direction of the first length. Although omitted for the sake of brevity of the drawings, when referring to FIG. 7, in at least one of the lenses L1 and L2 of the first lens group G1, at least one of the lenses L3, L4. L5, and L6 of the second lens group G2, and/or the aperture (e.g., the surface indicated by "S5" of FIG. 8), the first length may mean a length measured along the Y-axis direction, and the second length may mean a length measured along the Z-axis direction. In certain embodiments, when at least one of the lens(es) L1, L2, L3, L4, L5, L6, L7, and L8 or the aperture has an elliptical shape, the first length may be the major diameter of the elliptical shape in the Y-axis direction, and the second length may be the minor diameter of the elliptical shape in the Z-axis direction.

According to an embodiment, when the lens(es) L1, L2, L3, L4, L5, L6, L7, and L8 or the aperture has a non-circular shape, the lens assembly 500, the lens(es) L1, L2, L3, L4, L5, L6, L7, and L8 and/or the aperture may be configured to satisfy the condition presented through the following [Mathematical equation 3].

$$0.4 \leq Dz/Dy \leq 0.98 \hspace{2cm} \text{[Mathematical equation 3]}$$

Here, the "Dy" is the major diameter or the first length of the effective diameter of the aperture, and the "Dz" is the minor diameter or the second length of the effective diameter of the aperture. According to one embodiment, when the effective diameter of the lens(es) L1, L2, L3, L4, L5, L6, L7, and L8 or the aperture satisfies the condition of [Mathematical equation 3], the lens assembly 500 may be easily mounted on a miniaturized or thin electronic device (e.g., the electronic device 101, 200, 300, or 400 of FIG. 1 to FIG. 6) while implementing the telephoto function also. For example, the optical axis O and/or the first length may be arranged to be substantially parallel to the XY plane (e.g., the XY plane of FIG. 2 to FIG. 4), the second length may be disposed to be perpendicular to the XY plane and parallel to the Z axis. In some embodiments, the lens(es) L7 and L8 of the third lens group G3, which is adjacent to the image sensor 451, may have a sufficiently small effective diameter, and in this case, the lenses L7 and L8 of the third lens group G3 may have a substantially circular effective diameter.

According to an embodiment, the shape of the lens(es) L1, L2, L3, L4, L5, L6, L7, and L8 or the aperture as described above has been generally described based on the effective diameter, but the actual outer shape of the lens(es) L1, L2, L3, L4, L5, L6, L7, and L8 or the aperture may differ from the effective diameter. For example, in order to be arranged in or fixed to a barrel structure, the lens(es) L1, L2, L3, L4, L5, L6, L7, and L8 or the aperture may include an additional structure, and the structure may be configured to have various shapes without being affected by the effective diameter of the lens(es) L1, L2, L3, L4, L5, L6, L7, and L8 or the aperture.

In the embodiments of FIG. 8, FIG. 12, FIG. 16, FIG. 20, and/or FIG. 24 described below; when the second length (e.g., minor diameter) of the aperture is about 4.6 mm or about 3.0 mm and the second curve sections CS2 of each of the lenses L1, L2, L3, L4, L5, L6, L7, and L8 are straight (e.g., having infinite curvature radius), values calculated by [Mathematical equation 3] are shown in [Table 2]. In [Table 2], when the second length is about 4.6 mm, the lenses L7 and L8 of the third lens group G3 may have a value of 1 or more. In this case, the effective diameter of the lenses L7 and L8 of the third lens group G3 would be sufficiently small and the D-cut shape may not be applied to the lenses L7 and L8 of the third lens group G3. For example, the D-cut may be applied to the structure for arrangement or fixation of the lens(es) L1, L2, L3, L4, L5, L6, L7, and L8 or the aperture.

In some embodiments, when the second length in [Table 2] is about 3.0 mm and the lens(es) L1, L2, L3, L4, L5, L6, L7, and L8 or the aperture includes the structure for arrangement or fixation, in the case of the calculation based on the external shape or size of the lens(es) L1, L2, L3, L4, L5, L6, L7, and L8 or the aperture regardless of the effective diameter, the lenses may have values approximated to the upper limit value or lower limit value of the range presented in [Mathematical equation 3].

TABLE 2

| | Embodiment of FIG. 8 | Embodiment of FIG. 12 | Embodiment of FIG. 16 | Embodiment of FIG. 20 | Embodiment of FIG. 24 |
|---|---|---|---|---|---|
| | | | Dz = 4.6 | | |
| L1 | 0.75 | 0.75 | 0.75 | 0.82 | 0.82 |
| L2 | 0.72 | 0.72 | 0.73 | 0.80 | 0.81 |
| L3 | 0.68 | 0.68 | 0.69 | 0.76 | 0.78 |
| L4 | 0.73 | 0.74 | 0.74 | 0.81 | 0.82 |
| L5 | 0.93 | 0.94 | 0.94 | 0.98 | 0.98 |
| L6 | 0.95 | 0.95 | 0.95 | 0.97 | 0.98 |
| L7 | 1.21 | 1.21 | 1.21 | 1.21 | 1.22 |
| L8 | 1.17 | 1.16 | 1.17 | 1.16 | 1.16 |
| | | | Dz = 3.0 | | |
| L1 | 0.48 | 0.47 | 0.48 | 0.53 | 0.54 |
| L2 | 0.47 | 0.47 | 0.47 | 0.52 | 0.53 |
| L3 | 0.44 | 0.44 | 0.44 | 0.49 | 0.51 |
| L4 | 0.46 | 0.46 | 0.45 | 0.50 | 0.51 |
| L5 | 0.58 | 0.58 | 0.57 | 0.61 | 0.60 |
| L6 | 0.60 | 0.61 | 0.61 | 0.63 | 0.63 |
| L7 | 0.75 | 0.75 | 0.75 | 0.74 | 0.75 |
| L8 | 0.71 | 0.70 | 0.71 | 0.71 | 0.71 |

According to an embodiment, when the lens(es) L1, L2, L3, L4, L5, L6, L7, and L8 or the aperture has a non-circular shape, the edge of the effective diameter may partially extend beyond the edges of the lens(es) L1, L2, L3, L4, L5, L6, L7, and L8 due to a partial curvature deviation of the edge of the effective diameter or due to the D-cut shape. The above shape of the lens(es) L1, L2, L3, L4, L5, L6, L7, and L8 may cause flares and may intensify variations in image quality when images are taken in different photographing environments. According to one embodiment, the edge of the lens(es) L1, L2, L3, L4, L5, L6, L7, and L8 may be treated with black painting, by digging, and/or with carbonation so as to suppress or alleviate the flare phenomenon.

According to an embodiment, the reflection member 455 may be configured to rotate around at least one rotation axis so as to implement a scan or an image stabilization operation. For example, the reflection member 455 may be aligned in the optical axis O together with the lenses L1, L2, L3, L4, L5, L6, L7, and L8, and may be configured to perform at least one of a rolling motion RO of rotating around the optical axis O, a pitching motion PI of rotating around a first axis A1 different from the optical axis O, or a yawing motion YA of rotating around a second axis A2 different from the optical axis O and/or the first axis A1. The rolling motion RO, the pitching motion PI, or the yawing motion YA of the reflection member 455 may be based on vibration sensed by a sensor module (e.g., the sensor module 176 of FIG. 1) of the electronic device. In one embodiment, the first axis A1 may intersect the optical axis O to be substantially perpendicular, and the second axis A2 may intersect the optical axis O and the first axis A1 to be substantially perpendicular. In some embodiments, the optical axis O, the first axis A1, and/or the second axis A2 may intersect substantially at one point.

Referring again to FIG. 6, the electronic device 400 may include a first camera support member 381 or a second camera support member 383. The first camera support member 381 or the second camera support member 383 may be configured to dispose or fix at least one of the camera module 405 and/or another camera module (e.g., wide-angle camera, ultra-wide camera, or close-up camera) adjacent to the camera module 405 on the rear plate 380 or inside the camera window 385. In some embodiments, the first camera support member 381 or the second camera support member 383 may be a part of the first support member (e.g., the second support member 360 of FIG. 4) or the second support member (e.g., the first support member 311 of the FIG. 4).

Although reference numbers of the drawings and detailed descriptions have been omitted, the camera module 405 or the electronic device 400 may further include a barrel structure for disposing the lens(es) 453 in a designated position, and/or a driving device for moving forward or backward at least one of the lens(es) 453 or the lens groups G1, G2, and G3 in order to perform focus adjustment. In some embodiments, in a plane substantially perpendicular to the direction of the optical axis O, the camera module 405 or the electronic device 400 may further include another driving device for moving the image sensor 451, and may be configured to move the image sensor 451 so as to perform image stabilization. In another embodiment, as explained above, image stabilization may be implemented by rotating the reflection member 455 (e.g., prism) around at least one rotation axis. To perform image stabilization, the reflection member 455 may be configured to perform rolling, yawing, or pitching motions (e.g., the rolling motion RO, the yawing motion YA, or the pitching motion PI of FIG. 7) in an angle range of about 1.5 degrees.

According to an embodiment, when combined with other camera modules (e.g., wide-angle camera, ultra-wide-angle camera, or close-up camera), the camera module 405 or the lens assembly 500 may be configured to function as a tracking or scan camera which tracks a subject within an area of an image photographed by the wide-angle camera, the ultra-wide-angle camera, or the close-up camera or scans a partial area of an image. In the operation of tracking the subject or scanning a part of the image area, the reflection member 455 may be configured to perform the rolling motion RO, the pitching motion PI, or the yawing motion YA, and in the rolling motion RO, the pitching motion PI, or the yawing motion YA for scanning, the angle range in which the reflection member 455 rotates may be larger than that during image stabilization.

In the following detailed descriptions, certain embodiments of the lens assembly (e.g., the camera module 405 of FIG. 6 or the lens assembly 500 of FIG. 7) will be described. In the drawings, in describing lens surfaces of lens(es) and/or infrared blocking filter(s), it should be noted that reference numbers of the object-side surfaces are described in the drawings (e.g., FIG. 8, FIG. 12, FIG. 16, FIG. 20, or FIG. 24) correspond to the wide-angle end, and reference numbers of the image sensor side are described in the drawings (e.g., FIG. 9), FIG. 13, FIG. 17, FIG. 21, or FIG. 25) correspond to the telephoto end. In certain embodiments, "the wide-angle end" may refer to the position or state in which the focal length of the lens assembly 500 is at its minimum and the field of view is at its maximum, in the movement range of the second lens group G2 or the third lens group G3, and "the telephoto end" may refer to the position or state in which the focal length of the lens assembly 500 is at its maximum and the field of view is at its minimum.

Figure 9:
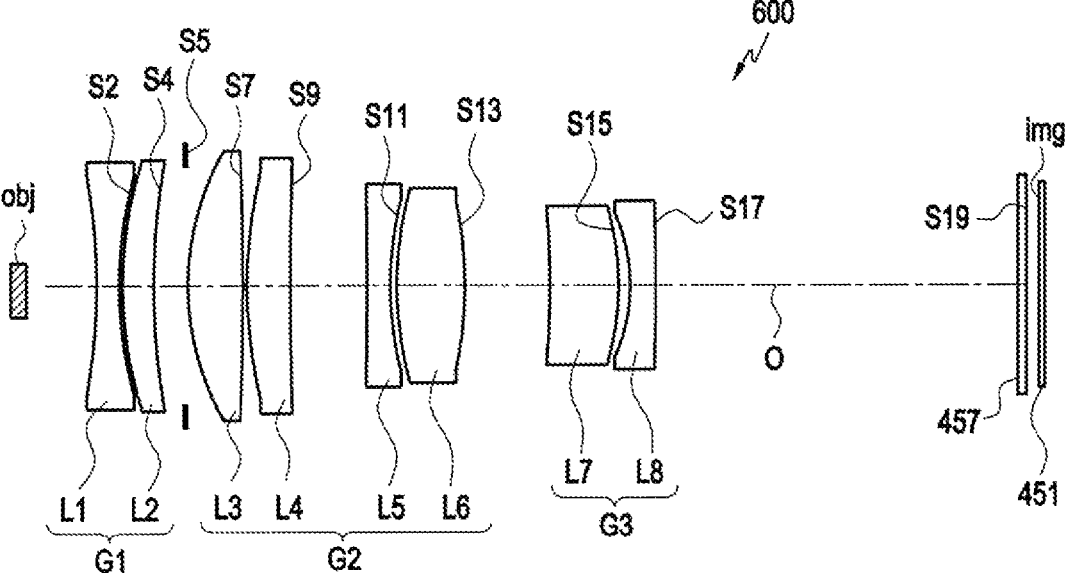
FIG. 9 is a view showing a lens (group) arrangement in a telephoto end of the lens assembly of FIG. 8.
Figure 10A:
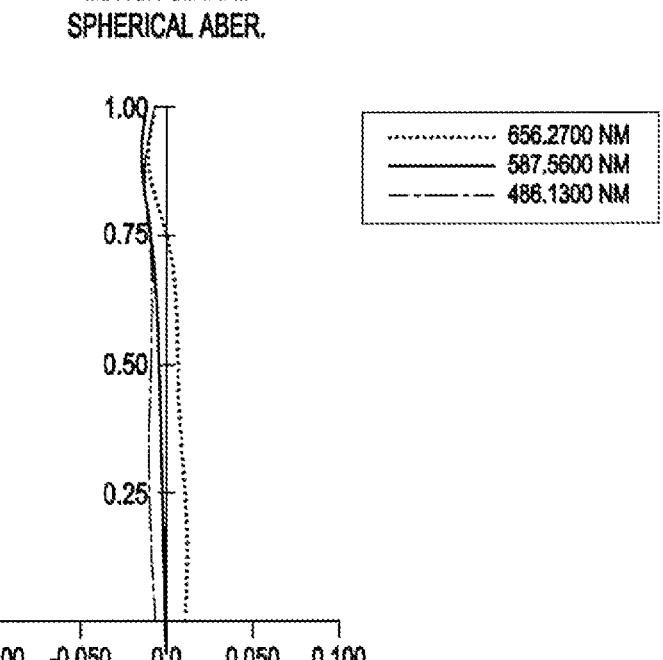
FIG. 10A is a graph showing spherical aberration of the lens assembly of FIG. 8.
Figures 10B, 10C:
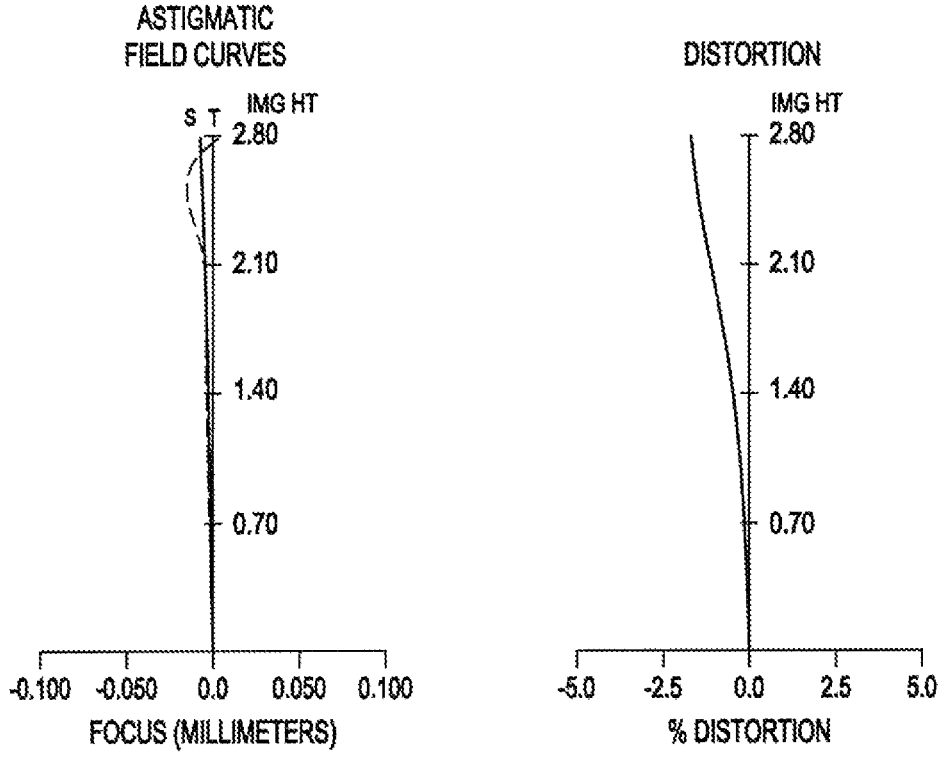
FIG. 10B is a graph showing astigmatic aberration of the lens assembly of FIG. 8.
FIG. 10C is a graph showing distortion rate of the lens assembly of FIG. 8.
Figure 11A:
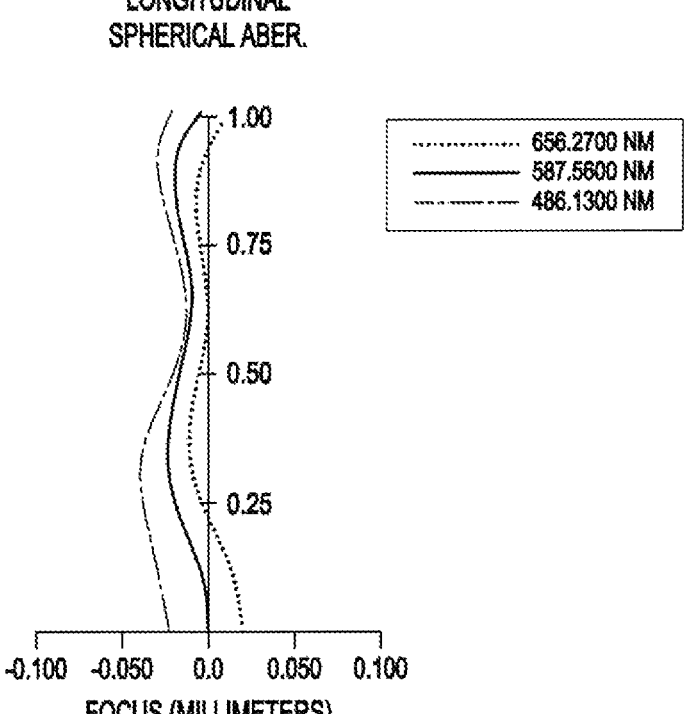
FIG. 11A is a graph showing spherical aberration of the lens assembly of FIG. 9.
Figures 11B, 11C:
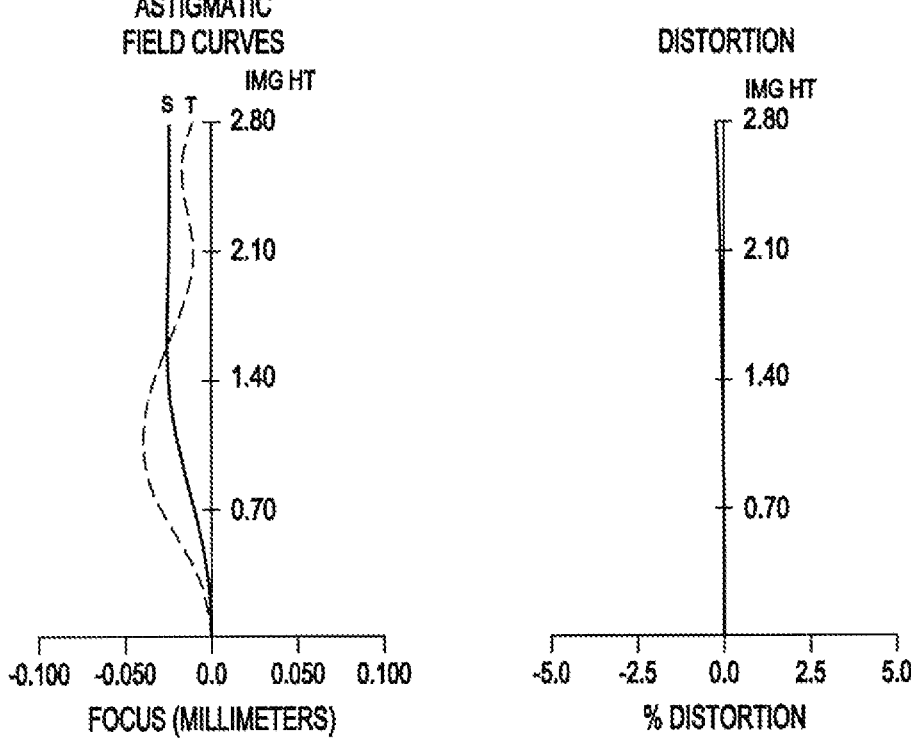
FIG. 11B is a graph showing astigmatic aberration of the lens assembly of FIG. 9.
FIG. 11C is a graph showing distortion rate of the lens assembly of FIG. 9.

FIG. 8 is a view showing a lens (group) arrangement in the wide-angle end of a lens assembly 600 according to an embodiment of the disclosure. FIG. 9 is a view showing a lens (group) arrangement in the telephoto end of the lens assembly 600 of FIG. 8. FIG. 10A is a graph showing spherical aberration of the lens assembly 600 of FIG. 8. FIG. 10B is a graph showing astigmatic aberration of the lens assembly 600 of FIG. 8. FIG. 10C is a graph showing distortion rate of the lens assembly 600 of FIG. 8. FIG. 11A is a graph showing spherical aberration of the lens assembly 600 of FIG. 9. FIG. 11B is a graph showing astigmatic aberration of the lens assembly 600 of FIG. 9. FIG. 11C is a graph showing distortion rate of the lens assembly 600 of FIG. 9.

In FIG. 10A to FIG. 11C and/or in the various graphs relating to lens assembly(ies) presented hereafter, "S" shows the sagittal plane, and "T" shows the tangential plane. In FIG. 10A to FIG. 11C and/or in the various graphs relating to lens assembly(ies) presented hereafter, the spherical aberration is measured based on light at wavelength of 656.27100 nm, wavelength of 587.5600 nm, and/or wavelength of 486.1300 nm.

Referring to FIG. 8 to FIG. 11C, the lens assembly 600 (e.g., the camera module 405 of FIG. 6 or the lens assembly 500 of FIG. 7) may be configured to satisfy at least one of the configurations mentioned in the above-described embodiments or conditions presented through [Mathematical equations], and may include the first lens group G1, the second lens group G2, the third lens group G3, the infrared blocking filter 457, and/or the image sensor 451 (e.g., having a sensor surface or an image formation surface img) which are arranged sequentially from the object obj side. The first lens group G1 may include two lenses L1 and L2, the second lens group G2 may include four lenses L3, L4, L5, and L6, and the third lens group G3 may include two lenses L7 and L8. In one embodiment, according to the forward/backward movement of the second lens group G2 and/or the third lens group G3 between the wide-angle end and the telephoto end, the lens assembly 600 may be configured such that the focal length thereof is adjusted in the range of about 11.5-27.5 mm, the f-number thereof is adjusted in the range of about 2.8-5.0, and the field of view is adjusted in the range of about 28.2-11.6 degrees.

The following [Table 3] and [Table 4] show the lens data of the lens assembly 600 illustrated in FIG. 8 or FIG. 9. The "curvature radius" may be the curvature radius of a lens surface, which is measured at a point intersecting the optical axis O, and the "thickness or air gap" may be the thickness of the lens L1, L2, L3, L4, L5, L6, L7, or L8 or the infrared blocking filter 457, or the distance between two adjacent lenses L1, L2, L3, L4, L5, L6, L7, and L8, which is measured at a point intersecting the optical axis O.

TABLE 3

| Lens surface | Curvature radius | Thickness or Air gap | Refractive index (nd) | Abbe's number (vd) | Focal length (EFL) | Effective radius (H-APE) |
|---|---|---|---|---|---|---|
| obj | infinity | infinity | | | | |
| S1* | −15.505 | 0.65 | 1.544 | 56.09 | −12.3 | 3.050 |
| S2* | 11.926 | 0.10 | | | | 3.147 |
| S3 | 11.015 | 0.88 | 1.847 | 23.78 | 33.3 | 3.189 |
| S4 | 17.412 | D1 | | | | 3.189 |
| S5(stop) | infinity | 0.00 | | | | 3.300 |
| S6 | 7.258 | 1.65 | 1.497 | 81.61 | 13.0 | 3.419 |
| S7 | −56.084 | 0.10 | | | | 3.368 |
| S8* | 11.009 | 1.27 | 1.544 | 56.09 | 23.2 | 3.279 |
| S9* | 83.793 | 2.20 | | | | 3.134 |
| S10 | −70.326 | 0.69 | 1.847 | 23.78 | −9.3 | 2.602 |
| S11 | 8.932 | 0.19 | | | | 2.477 |
| S12* | 9.847 | 2.00 | 1.535 | 55.71 | 9.9 | 2.481 |
| S13* | −10.575 | D2 | | | | 2.430 |
| S14* | −13.457 | 2.00 | 1.650 | 21.52 | 13.2 | 1.900 |
| S15* | −5.548 | 0.45 | | | | 1.997 |
| S16* | −4.025 | 0.60 | 1.5348 | 55.71 | −7.0 | 1.974 |
| S17* | 58.649 | D3 | | | | 2.124 |
| S18 | infinity | 0.21 | 1.5168 | 64.2 | | |
| S19 | infinity | — | | | | |
| img | infinity | — | | | | |

TABLE 4

| Air gap | Wide-angle end | Telephoto end |
|---|---|---|
| D1 | 8.63 | 0.85 |
| D2 | 3.32 | 2.40 |
| D3 | 3.03 | 11.73 |

The following [Table 5] and [Table 6] show the aspherical surface data of the lenses L1, L2, L3, L4, L5, L6, L7, and L8 of the lens assembly 600. An aspherical lens surface is marked with the symbol "*" in [Table 3], and may be defined by the following [Mathematical equation 4].

$$x = \frac{c'z^2}{\left(1 + \sqrt{1 - (K+1)c'^2 z^2}\right)} + Az^4 + Bz^6 + \qquad \text{[Mathematical equation 4]}$$

$$Cz^8 + Dz^{10} + Ez^{12} + Fz^{14} + Gz^{16} + Hz^{18} + Jz^{20}$$

Here, the "x" may be a distance in the direction of the optical axis O from the vertex of the lens L1, L2, L3, L4, L5, L6, L7, or L8, the "z" may be is a distance in a direction perpendicular to the optical axis O, the "c" may be the inverse of the curvature radius (=1/radius) at the vertex of the lens L1, L2, L3, L4, L5, L6, L7, or L8, the "K" may be the Conic constant, and the "A", "B", "C", "D", "E", "F", "G", "H", and "J" may be aspherical surface coefficients in the following [Table 5] and [Table 6].

TABLE 5

| Lens surface | K | A | B | C | D |
|---|---|---|---|---|---|
| S1 | 1.9544 | −7.8902E−05 | 1.5754E−05 | −4.1614E−07 | 0.0000E+00 |
| S2 | −0.7555 | −7.9435E−05 | 1.6046E−05 | −4.3945E−07 | 0.0000E+00 |
| S8 | 0.0000 | −4.8431E−04 | −1.2040E−05 | −2.2191E−07 | 0.0000E+00 |
| S9 | 3.6860 | −1.0319E−04 | −6.6445E−06 | 0.0000E+00 | 0.0000E+00 |
| S12 | −1.0455 | 2.9927E−05 | −1.0307E−06 | 6.7568E−06 | 0.0000E+00 |
| S13 | 0.1904 | 7.0344E−04 | −6.3825E−06 | 7.6152E−06 | 0.0000E+00 |
| S14 | −17.9233 | 2.5715E−03 | −7.2224E−05 | 4.5466E−06 | 4.4278E−08 |

TABLE 5-continued

| Lens surface | K | A | B | C | D |
|---|---|---|---|---|---|
| S15 | −11.4508 | −3.4890E−04 | −5.4128E−04 | 3.9960E−05 | 2.2304E−06 |
| S16 | −14.0815 | −2.2108E−02 | 3.1800E−03 | −7.0013E−04 | 1.3569E−04 |
| S17 | −51.4387 | −4.2122E−03 | −1.9921E−03 | 1.2032E−03 | −3.0175E−04 |

TABLE 6

| Lens surface | E | F | G | H | J |
|---|---|---|---|---|---|
| S1 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | −9.5430E−06 | 0.0000E+00 | 0.0000E+00 | 0.0000E+00 | 0.0000E+00 |
| S17 | 4.1487E−05 | −2.3612E−06 | 0.0000E+00 | 0.0000E+00 | 0.0000E+00 |

Figure 13:
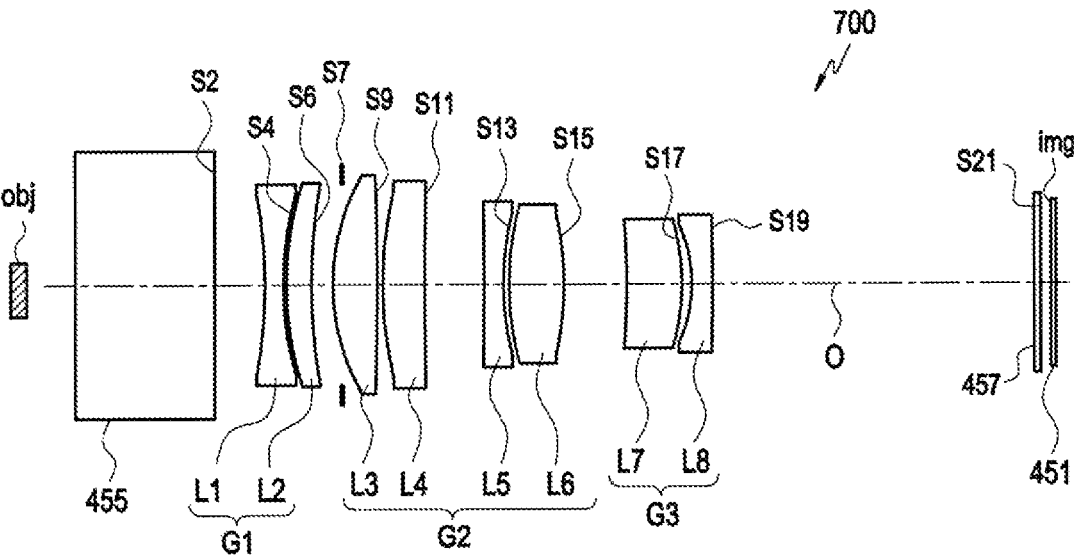
FIG. 13 is a view showing a lens (group) arrangement in a telephoto end of the lens assembly of FIG. 12.
Figure 14A:
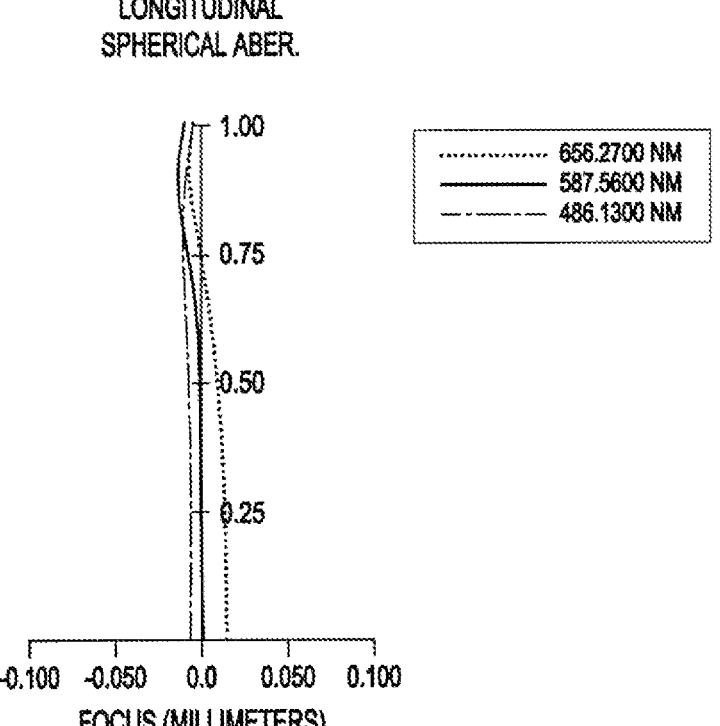
FIG. 14A is a graph showing spherical aberration of the lens assembly of FIG. 12.
Figures 14B, 14C:
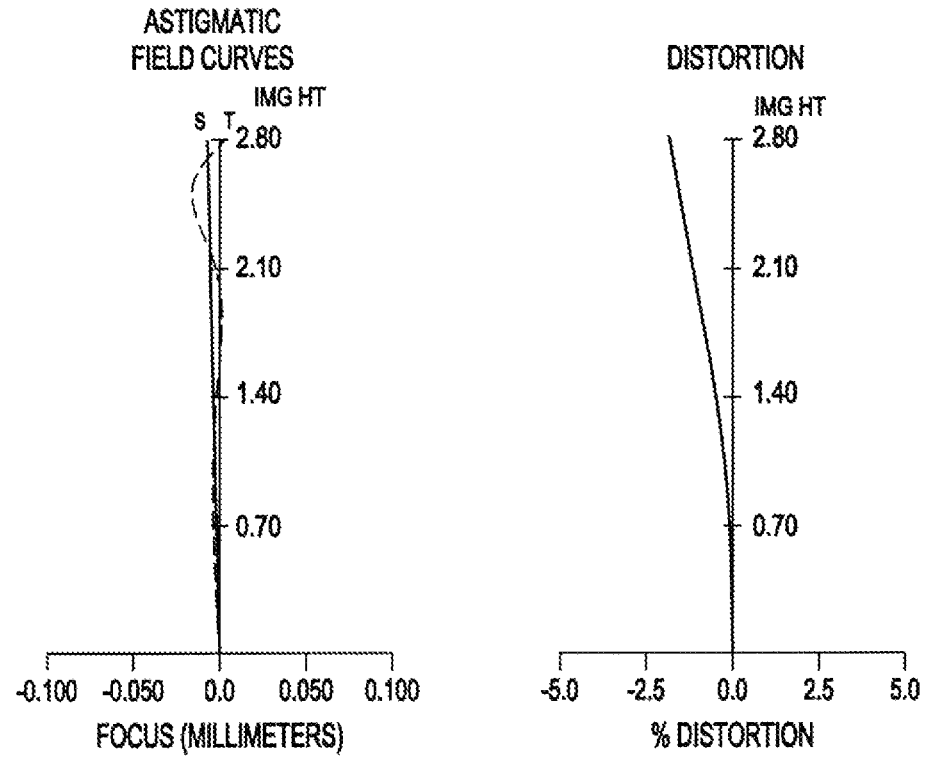
FIG. 14B is a graph showing astigmatic aberration of the lens assembly of FIG. 12.
FIG. 14C is a graph showing distortion rate of the lens assembly of FIG. 12.
Figure 15A:
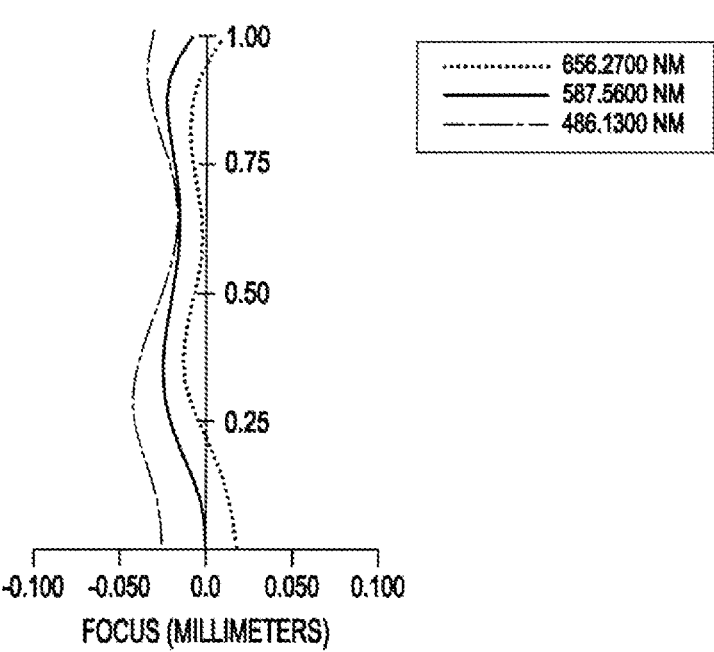
FIG. 15A is a graph showing spherical aberration of the lens assembly of FIG. 13.
Figures 15B, 15C:
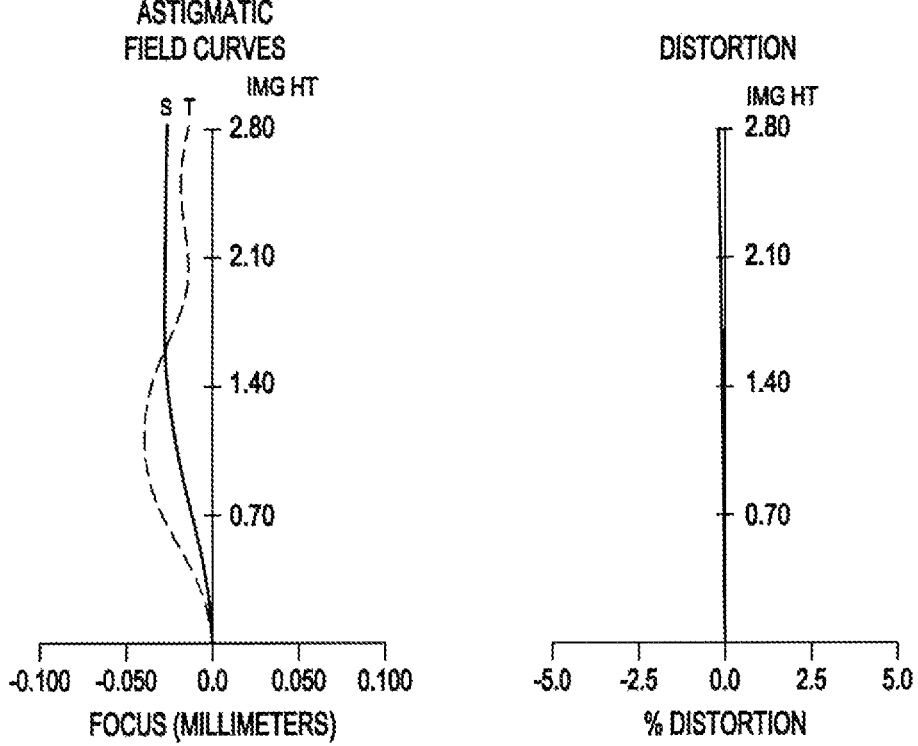
FIG. 15B is a graph showing astigmatic aberration of the lens assembly of FIG. 13.
FIG. 15C is a graph showing distortion rate of the lens assembly of FIG. 13.

FIG. 12 is a view showing a lens (group) arrangement in the wide-angle end of a lens assembly 700 according to an embodiment of the disclosure. FIG. 13 is a view showing a lens (group) arrangement in the telephoto end of the lens assembly 700 of FIG. 12. FIG. 14A is a graph showing spherical aberration of the lens assembly 700 of FIG. 12. FIG. 14B is a graph showing astigmatic aberration of the lens assembly 700 of FIG. 12. FIG. 14C is a graph showing distortion rate of the lens assembly 700 of FIG. 12. FIG. 15A is a graph showing spherical aberration of the lens assembly 700 of FIG. 13. FIG. 15B is a graph showing astigmatic aberration of the lens assembly 700 of FIG. 13. FIG. 15C is a graph showing distortion rate of the lens assembly 700 of FIG. 13.

Referring to FIG. 12 to FIG. 15C, the lens assembly 700 (e.g., the camera module 405 of FIG. 6 or the lens assembly 500 of FIG. 7) may be configured to satisfy at least one of the configurations mentioned in the above-described embodiments or conditions presented through [Mathematical equations], and may include the reflection member 455, the first lens group G1, the second lens group G2, the third lens group G3, the infrared blocking filter 457, and/or the image sensor 451, which are arranged sequentially from the object obj side. In one embodiment, according to the forward/backward movement of the second lens group G2 and/or the third lens group G3 between the wide-angle end and the telephoto end, the lens assembly 700 may be configured such that the focal length thereof is adjusted in the range of about 11.2-26.7 mm, the f-number thereof is adjusted in the range of about 2.5-4.4, and the field of view is adjusted in the range of about 28.3-12.0 degrees.

The following [Table 7] and [Table 8] show the lens data of the lens assembly 700 illustrated in FIG. 12 or FIG. 13, and the following [Table 9] and [Table 10] show aspherical surface coefficients of the lenses L1, L2, L3, L4, L5, L6, L7, and L8.

TABLE 7

| Lens surface | Curvature radius | Thickness or Air gap | Refractive index | Abbe's number | Focal length | Effective radius |
|---|---|---|---|---|---|---|
| obj | infinity | infinity | | | | |
| S1 | infinity | 5.00 | 1.717 | 29.5 | | 4.19 |
| S2 | infinity | 1.80 | | | | 3.46 |

TABLE 7-continued

| Lens surface | Curvature radius | Thickness or Air gap | Refractive index | Abbe's number | Focal length | Effective radius |
|---|---|---|---|---|---|---|
| S3* | −15.738 | 0.65 | 1.544 | 56.09 | −12.4 | 3.08 |
| S4* | 11.902 | 0.10 | | | | 3.16 |
| S5 | 10.756 | 0.88 | 1.847 | 23.78 | 33.6 | 3.21 |
| S6 | 16.635 | D1 | | | | 3.20 |
| S7(stop) | infinity | 0.00 | | | | 3.33 |
| S8 | 7.363 | 1.67 | 1.497 | 81.61 | 13.0 | 3.43 |
| S9 | −50.254 | 0.10 | | | | 3.38 |
| S10* | 10.549 | 1.54 | 1.544 | 56.09 | 21.9 | 3.29 |
| S11* | 88.530 | 2.03 | | | | 3.10 |
| S12 | −80.124 | 0.70 | 1.847 | 23.78 | −9.1 | 2.58 |
| S13 | 8.531 | 0.22 | | | | 2.45 |
| S14* | 9.768 | 2.00 | 1.535 | 55.71 | 9.9 | 2.45 |
| S15* | −10.758 | D2 | | | | 2.43 |
| S16* | −13.094 | 2.00 | 1.65038 | 21.52 | 13.0 | 1.90 |
| S17* | −5.445 | 0.44 | | | | 2.00 |
| S18* | −3.988 | 0.61 | 1.535 | 55.71 | −7.0 | 1.98 |
| S19* | 61.665 | D3 | | | | 2.13 |
| S20 | infinity | 0.21 | 1.5168 | 64.2 | | |
| S21 | infinity | — | | | | |
| img | infinity | — | | | | |

TABLE 8

| Air gap | Wide-angle end | Telephoto end |
|---|---|---|
| D1 | 8.62 | 0.85 |
| D2 | 3.15 | 2.23 |
| D3 | 3.03 | 11.72 |

TABLE 9

| Lens surface | K | A | B | C | D |
|---|---|---|---|---|---|
| S3 | 1.9494 | −7.8245E−05 | 1.6156E−05 | −4.5458E−07 | 0.0000E+00 |
| S4 | −0.6784 | −7.3399E−05 | 1.6449E−05 | −4.6475E−07 | 0.0000E+00 |
| S10 | 0.0000 | −4.8020E−04 | −1.2255E−05 | −2.4465E−07 | 0.0000E+00 |
| S11 | −26.6770 | −1.0891E−04 | −7.5057E−06 | 0.0000E+00 | 0.0000E+00 |
| S14 | −0.9143 | 4.4714E−05 | 2.1706E−06 | 6.5847E−06 | 0.0000E+00 |
| S15 | 0.0699 | 7.1773E−04 | −5.6513E−06 | 7.5859E−06 | 0.0000E+00 |
| S16 | −18.1711 | 2.5792E−03 | −7.2738E−05 | 4.6201E−06 | 1.8816E−07 |
| S17 | −11.3321 | −3.9436E−04 | −5.4858E−04 | 3.8703E−05 | 2.2917E−06 |
| S18 | −13.8894 | −2.2205E−02 | 3.1427E−03 | −7.0329E−04 | 1.3593E−04 |
| S19 | −60.0000 | −4.3633E−03 | −1.9867E−03 | 1.1998E−03 | −3.0161E−04 |

TABLE 10

| Lens surface | E | F | G | H | J |
|---|---|---|---|---|---|
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | 0.0000E+00 | 0.0000E+00 | 0.0000E+00 | 0.0000E+00 | 0.0000E+00 |
| S17 | 0.0000E+00 | 0.0000E+00 | 0.0000E+00 | 0.0000E+00 | 0.0000E+00 |
| S18 | −9.5430E−06 | 0.0000E+00 | 0.0000E+00 | 0.0000E+00 | 0.0000E+00 |
| S19 | 4.1487E−05 | −2.3612E−06 | 0.0000E+00 | 0.0000E+00 | 0.0000E+00 |

Figure 17:
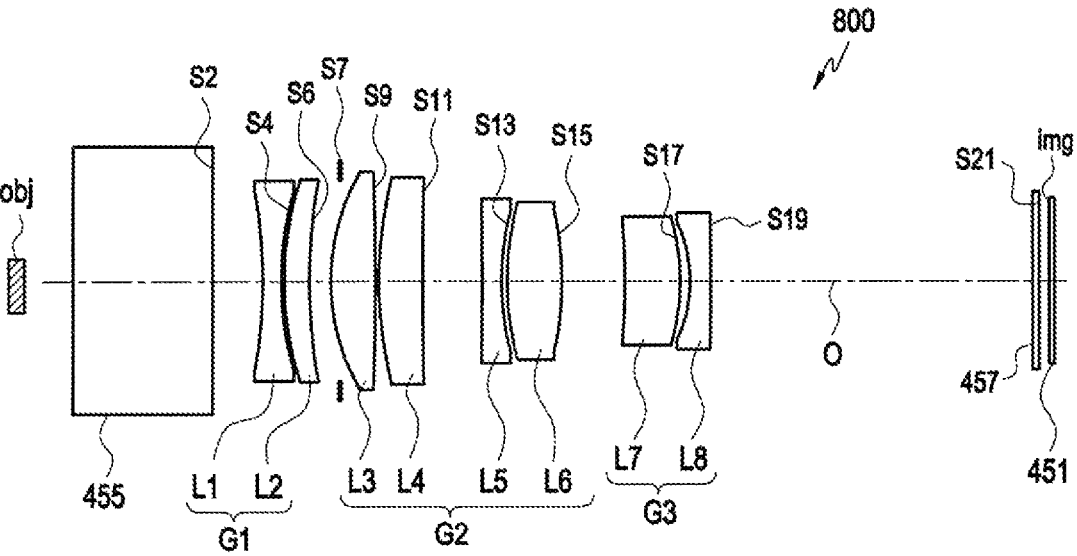
FIG. 17 is a view showing a lens (group) arrangement in a telephoto end of the lens assembly of FIG. 16.
Figure 18A:
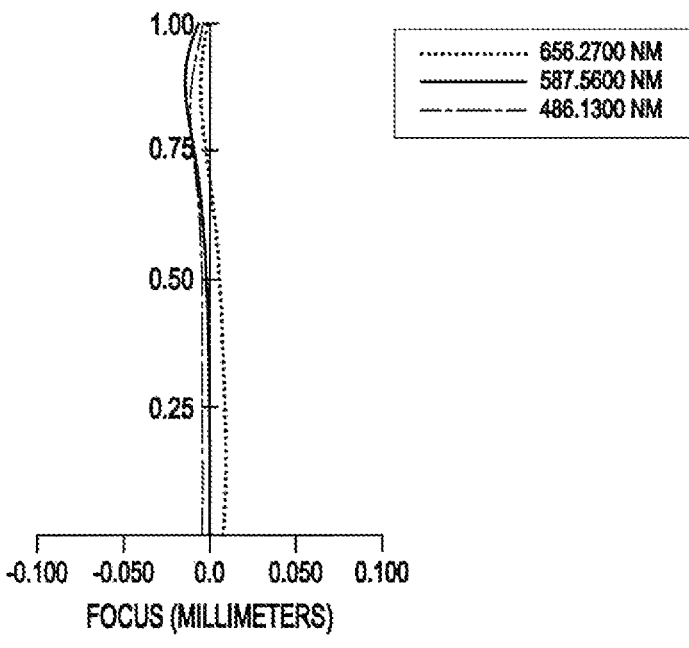
FIG. 18A is a graph showing spherical aberration of the lens assembly of FIG. 16.
Figures 18B, 18C:
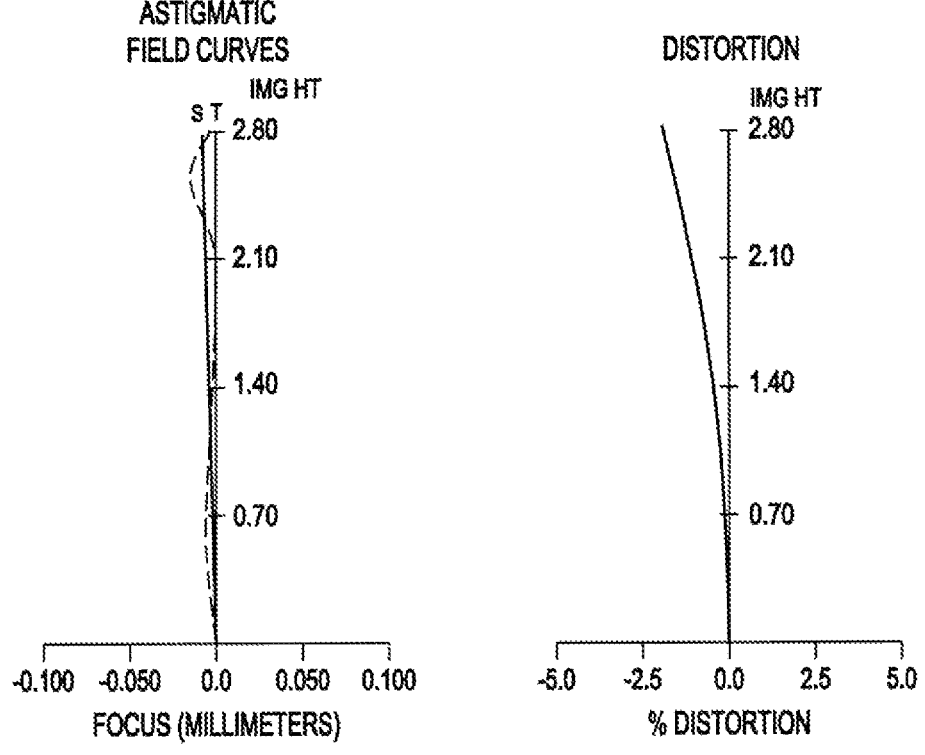
FIG. 18B is a graph showing astigmatic aberration of the lens assembly of FIG. 16.
FIG. 18C is a graph showing distortion rate of the lens assembly of FIG. 16.
Figure 19A:
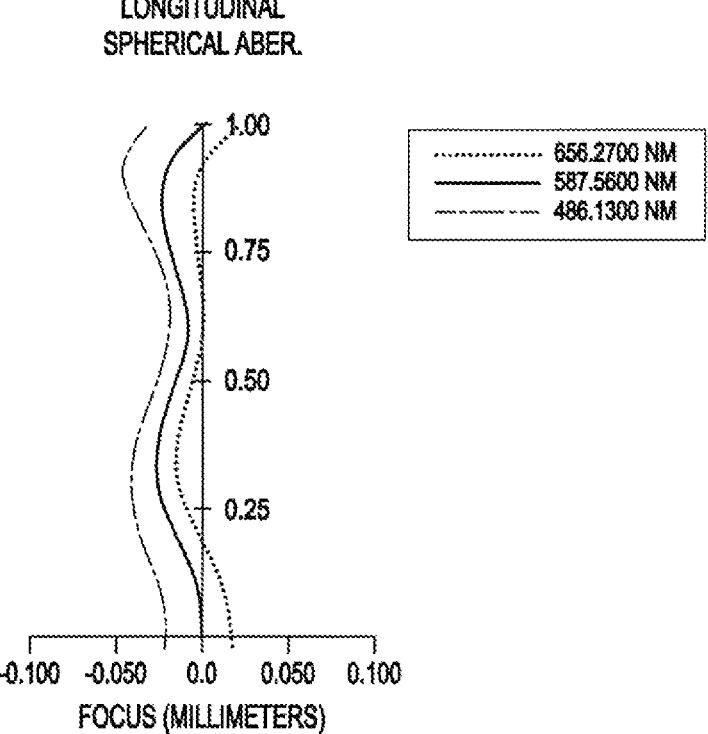
FIG. 19A is a graph showing spherical aberration of the lens assembly of FIG. 17.
Figures 19B, 19C:
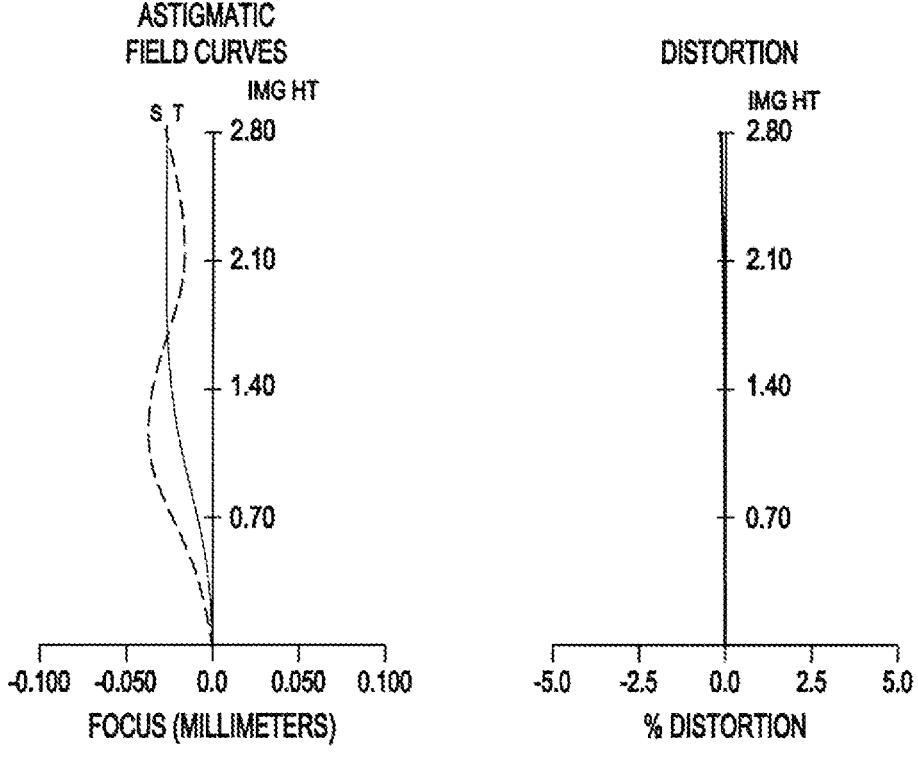
FIG. 19B is a graph showing astigmatic aberration of the lens assembly of FIG. 17.
FIG. 19C is a graph showing distortion rate of the lens assembly of FIG. 17.

FIG. 16 is a view showing a lens (group) arrangement in the wide-angle end of a lens assembly 800 according to an embodiment of the disclosure. FIG. 17 is a view showing a lens (group) arrangement in the telephoto end of the lens assembly 800 of FIG. 16. FIG. 18A is a graph showing spherical aberration of the lens assembly 800 of FIG. 16. FIG. 18B is a graph showing astigmatic aberration of the lens assembly 800 of FIG. 16. FIG. 18C is a graph showing distortion rate of the lens assembly 800 of FIG. 16. FIG. 19A is a graph showing spherical aberration of the lens assembly 800 of FIG. 17. FIG. 19B is a graph showing astigmatic aberration of the lens assembly 800 of FIG. 17. FIG. 19C is a graph showing distortion rate of the lens assembly 800 of FIG. 17.

Referring to FIG. 16 to FIG. 19C, the lens assembly 800 (e.g., the camera module 405 of FIG. 6 or the lens assembly 500 of FIG. 7) may be configured to satisfy at least one of the configurations mentioned in the above-described embodiments or conditions presented through [Mathematical equations], and may include the reflection member 455, the first lens group G1, the second lens group G2, the third lens group G3, the infrared blocking filter 457, and/or the image sensor 451, which are arranged sequentially from the object obj side. In one embodiment, according to the forward/backward movement of the second lens group G2 and/or the third lens group G3 between the wide-angle end and the telephoto end, the lens assembly 800 may be configured such that the focal length thereof is adjusted in the range of about 11.4-26.5 mm, the f-number thereof is adjusted in the range of about 2.5-4.4, and the field of view is adjusted in the range of about 28.0-12.0 degrees.

The following [Table 11] and [Table 12] show the lens data of the lens assembly 800 illustrated in FIG. 16 or FIG. 17, and the following [Table 13] and [Table 14] show aspherical surface coefficients of the lenses L1, L2, L3, L4, L5, L6, L7, and L8.

TABLE 11

| Lens surface | Curvature radius | Thickness or Air gap | Refractive index | Abbe's number | Focal length | Effective radius |
|---|---|---|---|---|---|---|
| obj | infinity | infinity | | | | |
| S1 | infinity | 5.00 | 1.717 | 29.5 | | 4.137 |
| S2 | infinity | 1.80 | | | | 3.424 |
| S3* | −15.632 | 0.65 | 1.544 | 56.09 | −12.8 | 3.050 |
| S4* | 12.700 | 0.17 | | | | 3.122 |
| S5 | 13.248 | 0.87 | 1.847 | 23.78 | 34.4 | 3.166 |
| S6 | 23.577 | D1 | | | | 3.179 |
| S7(stop) | infinity | 0.00 | | | | 3.302 |
| S8 | 7.104 | 1.42 | 1.497 | 81.61 | 17.2 | 3.400 |
| S9 | 39.407 | 0.10 | | | | 3.342 |
| S10* | 9.641 | 2.01 | 1.544 | 56.09 | 14.9 | 3.303 |
| S11* | −46.251 | 1.62 | | | | 3.101 |
| S12 | −115.599 | 0.70 | 1.805 | 25.46 | −7.8 | 2.617 |
| S13 | 6.678 | 0.27 | | | | 2.447 |
| S14* | 7.082 | 2.00 | 1.535 | 55.71 | 8.8 | 2.461 |
| S15* | −12.6520 | D2 | | | | 2.430 |
| S16* | −13.8830 | 2.00 | 1.65038 | 21.52 | 14.3 | 1.900 |
| S17* | −5.8800 | 0.49 | | | | 1.998 |
| S18* | −4.1740 | 0.64 | 1.535 | 55.71 | −7.2 | 1.973 |
| S19* | 55.8600 | D3 | | | | 2.127 |
| S20 | infinity | 0.21 | 1.5168 | 64.2 | | |
| S21 | infinity | — | | | | |
| img | infinity | — | | | | |

TABLE 12

| Air gap | Wide-angle end | Telephoto end |
|---|---|---|
| D1 | 8.44 | 0.80 |
| D2 | 3.33 | 2.04 |
| D3 | 3.03 | 11.96 |

TABLE 13

| Lens surface | K | A | B | C | D |
|---|---|---|---|---|---|
| S3 | 2.0149 | −8.4871E−05 | 1.2499E−05 | −3.1977E−07 | 0.0000E+00 |
| S4 | −1.0807 | −1.0826E−04 | 1.2448E−05 | −3.3945E−07 | 0.0000E+00 |
| S10 | 0.0000 | −4.4337E−04 | −1.0161E−05 | −2.3551E−07 | 0.0000E+00 |
| S11 | −72.3056 | −1.4630E−04 | −5.6593E−06 | 0.0000E+00 | 0.0000E+00 |
| S14 | −0.9839 | 0.0000E+00 | −1.0066E−05 | 6.0150E−06 | 0.0000E+00 |
| S15 | 1.5561 | 6.1265E−04 | −1.5019E−05 | 6.8345E−06 | 0.0000E+00 |
| S16 | −15.5300 | 2.5008E−03 | −8.9173E−05 | 2.6688E−06 | 1.2304E−06 |
| S17 | −11.3717 | −3.7816E−04 | −5.5924E−04 | 4.5411E−05 | 4.8107E−06 |
| S18 | −15.0000 | −2.2033E−02 | 3.2619E−03 | −7.0389E−04 | 1.3539E−04 |
| S19 | 3.7659 | −3.5112E−03 | −2.0600E−03 | 1.2027E−03 | −3.0344E−04 |

TABLE 14

| Lens surface | E | F | G | H | J |
|---|---|---|---|---|---|
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | 0.0000E+00 | 0.0000E+00 | 0.0000E+00 | 0.0000E+00 | 0.0000E+00 |
| S17 | 0.0000E+00 | 0.0000E+00 | 0.0000E+00 | 0.0000E+00 | 0.0000E+00 |
| S18 | −9.5430E−06 | 0.0000E+00 | 0.0000E+00 | 0.0000E+00 | 0.0000E+00 |
| S19 | 4.1487E−05 | −2.3612E−06 | 0.0000E+00 | 0.0000E+00 | 0.0000E+00 |

Figure 21:
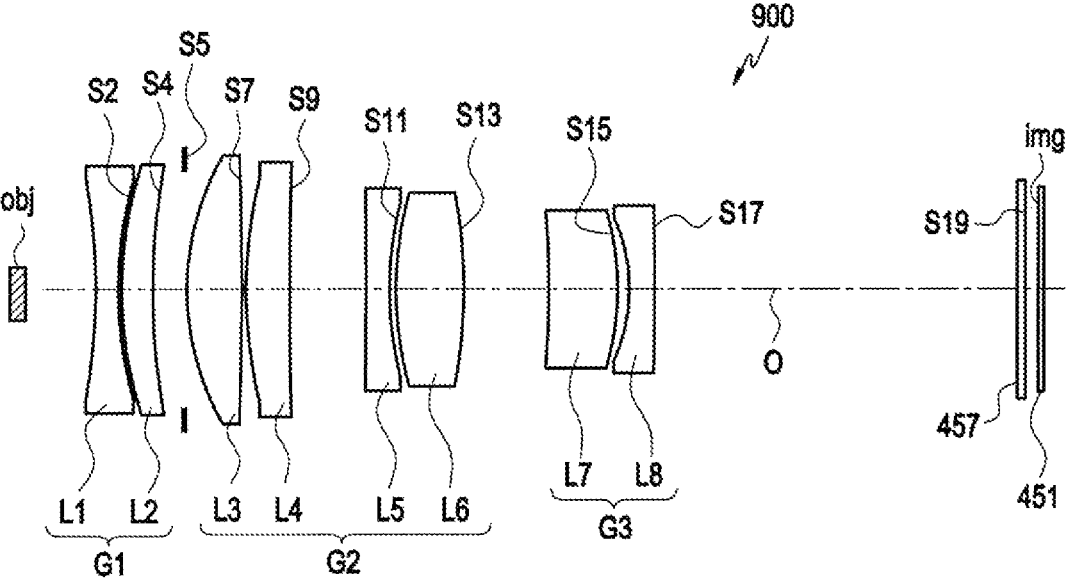
FIG. 21 is a view showing a lens (group) arrangement in a telephoto end of the lens assembly of FIG. 20.
Figure 22A:
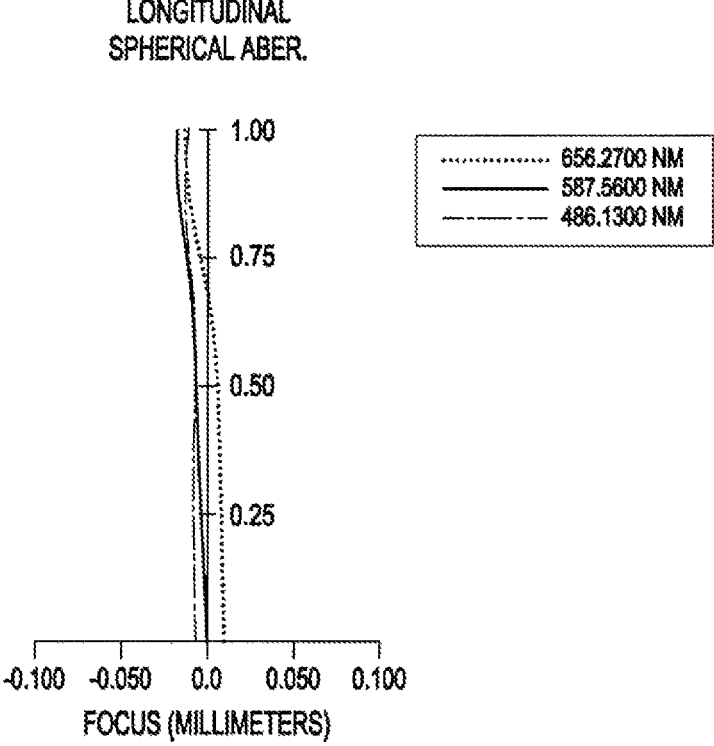
FIG. 22A is a graph showing spherical aberration of the lens assembly of FIG. 20.
Figures 22B, 22C:
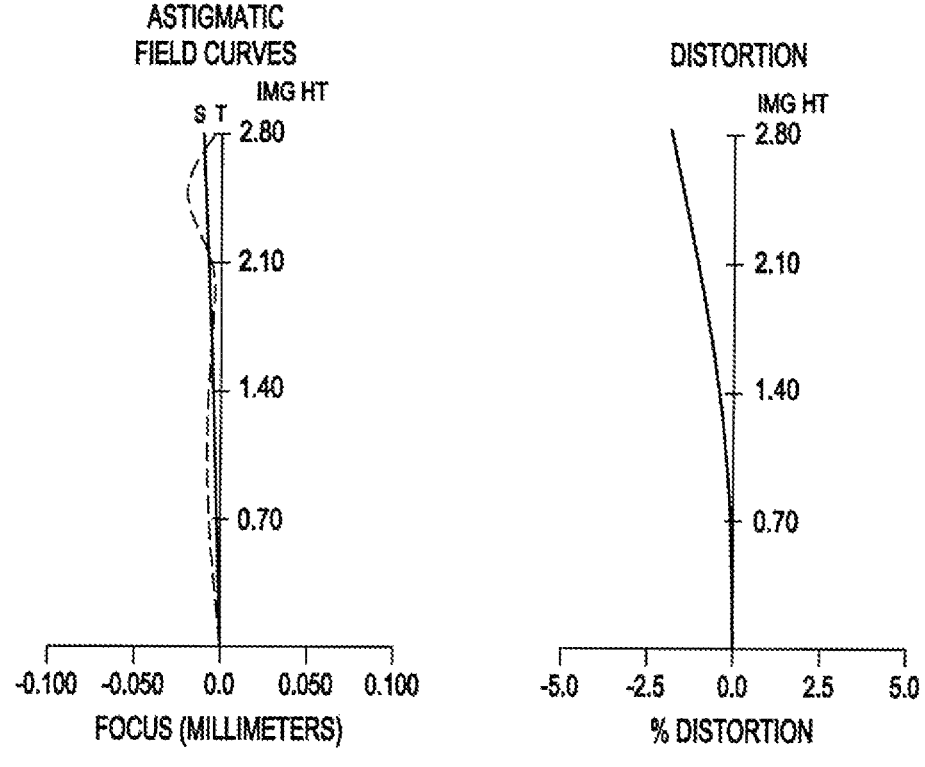
FIG. 22B is a graph showing astigmatic aberration of the lens assembly of FIG. 20.
FIG. 22C is a graph showing distortion rate of the lens assembly of FIG. 20.
Figure 23A:
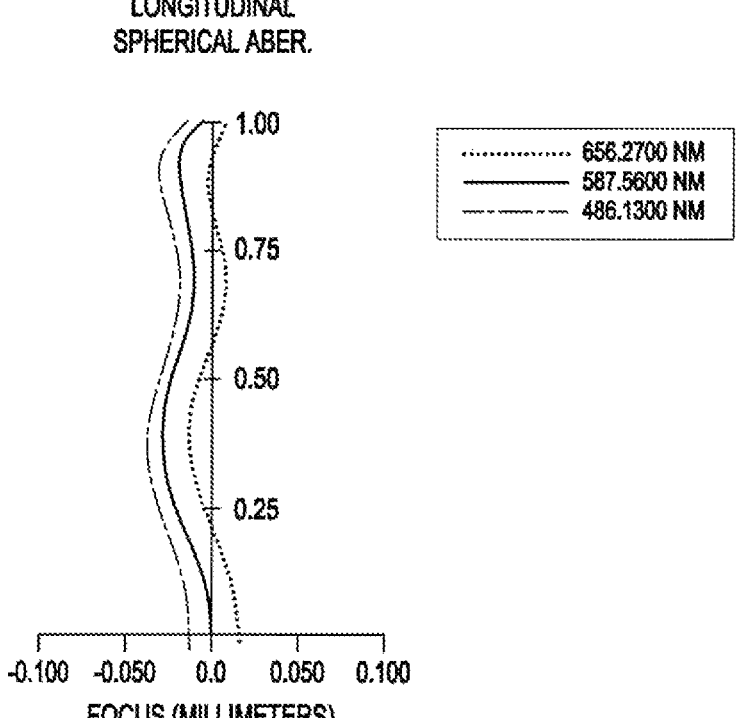
FIG. 23A is a graph showing spherical aberration of the lens assembly of FIG. 21.
Figures 23B, 23C:
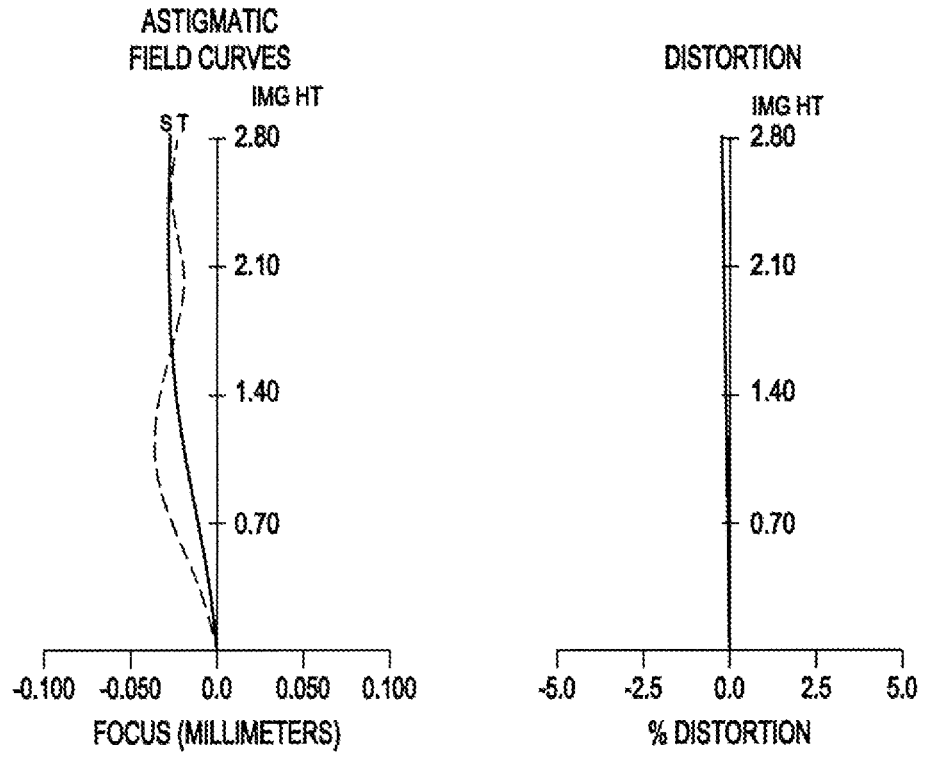
FIG. 23B is a graph showing astigmatic aberration of the lens assembly of FIG. 21.
FIG. 23C is a graph showing distortion rate of the lens assembly of FIG. 21.

FIG. 20 is a view showing a lens (group) arrangement in the wide-angle end of a lens assembly 900 according to an embodiment of the disclosure. FIG. 21 is a view showing a lens (group) arrangement in the telephoto end of the lens assembly 900 of FIG. 20. FIG. 22A is a graph showing spherical aberration of the lens assembly 900 of FIG. 20. FIG. 22B is a graph showing astigmatic aberration of the lens assembly 900 of FIG. 20. FIG. 22C is a graph showing distortion rate of the lens assembly 900 of FIG. 20. FIG. 23A is a graph showing spherical aberration of the lens assembly 900 of FIG. 21. FIG. 23B is a graph showing astigmatic aberration of the lens assembly 900 of FIG. 21. FIG. 23C is a graph showing distortion rate of the lens assembly 900 of FIG. 21.

Referring to FIG. 20 to FIG. 23C, the lens assembly 900 (e.g., the camera module 405 of FIG. 6 or the lens assembly 500 of FIG. 7) may be configured to satisfy at least one of the configurations mentioned in the above-described embodiments or conditions presented through [Mathematical equations], and may include the first lens group G1, the second lens group G2, the third lens group G3, the infrared blocking filter 457, and/or the image sensor 451, which are arranged sequentially from the object obj side. In one embodiment, according to the forward/backward movement of the second lens group G2 and/or the third lens group G3 between the wide-angle end and the telephoto end, the lens assembly 900 may be configured such that the focal length thereof is adjusted in the range of about 11.4-26.5 mm, the f-number thereof is adjusted in the range of about 2.8-4.8, and the field of view is adjusted in the range of about 20.0-16.5 degrees.

The following [Table 15] and [Table 16] show the lens data of the lens assembly 900 illustrated in FIG. 20 or FIG. 21, and the following [Table 17] and [Table 18] show aspherical surface coefficients of the lenses L1, L2, L3, L4, L5, L6, L7, and L8.

TABLE 15

| Lens surface | Curvature radius | Thickness or Air gap | Refractive index | Abbe's number | Focal length | Effective radius |
|---|---|---|---|---|---|---|
| obj | infinity | infinity | | | | |
| S1* | −15.613 | 0.65 | 1.544 | 56.09 | −12.4 | 2.800 |
| S2* | 12.093 | 0.16 | | | | 2.824 |
| S3 | 12.229 | 0.85 | 1.847 | 23.78 | 32.8 | 2.865 |
| S4 | 21.147 | D1 | | | | 2.873 |
| S5(stop) | infinity | 0.00 | | | | 2.982 |
| S6 | 7.445 | 1.07 | 1.509 | 79.05 | 25.8 | 3.050 |
| S7 | 16.307 | 0.10 | | | | 3.008 |
| S8* | 7.647 | 2.12 | 1.544 | 56.09 | 11.1 | 3.010 |
| S9* | −25.391 | 1.37 | | | | 2.839 |
| S10 | −51.085 | 0.60 | 1.781 | 26.3 | −7.3 | 2.466 |
| S11 | 6.451 | 0.22 | | | | 2.341 |
| S12* | 7.229 | 2.00 | 1.535 | 55.71 | 8.6 | 2.359 |
| S13* | −11.270 | D2 | | | | 2.400 |
| S14* | −12.280 | 1.94 | 1.650 | 21.52 | 15.9 | 1.900 |
| S15* | −5.962 | 0.60 | | | | 2.015 |
| S16* | −4.158 | 0.60 | 1.5348 | 55.71 | −7.8 | 1.985 |
| S17* | −921.208 | D3 | | | | 2.127 |
| S18 | infinity | 0.21 | 1.5168 | 64.2 | | |
| S19 | infinity | — | | | | |
| img | infinity | — | | | | |

TABLE 16

| Air gap | Wide-angle end | Telephoto end |
|---|---|---|
| D1 | 8.46 | 0.80 |
| D2 | 3.96 | 2.77 |
| D3 | 3.03 | 11.88 |

TABLE 17

| Lens surface | K | A | B | C | D |
|---|---|---|---|---|---|
| S1 | 1.7502 | −7.1207E−05 | 1.0696E−05 | −2.9553E−07 | 0.0000E+00 |
| S2 | −0.7634 | −9.0118E−05 | 1.1301E−05 | −3.3619E−07 | 0.0000E+00 |
| S8 | 0.0000 | −3.7047E−04 | −8.7085E−06 | −3.8306E−07 | 0.0000E+00 |
| S9 | −41.2822 | −1.7010E−04 | −5.8709E−07 | 0.0000E+00 | 0.0000E+00 |
| S12 | −1.4174 | 0.0000E+00 | −2.8647E−05 | 1.0611E−05 | 0.0000E+00 |
| S13 | 2.5328 | 5.0396E−04 | −2.7517E−05 | 1.0006E−05 | 0.0000E+00 |
| S14 | −11.7365 | 2.2975E−03 | −1.2599E−04 | 2.5746E−06 | 1.1766E−06 |
| S15 | −9.0578 | −4.3534E−04 | −5.3135E−04 | 3.4308E−05 | 7.5330E−06 |
| S16 | −14.3456 | −2.2936E−02 | 3.3847E−03 | −6.4947E−04 | 1.3495E−04 |
| S17 | 85.0000 | −2.9987E−03 | −2.1471E−03 | 1.2423E−03 | −3.0460E−04 |

TABLE 18

| Lens surface | E | F | G | H | J |
|---|---|---|---|---|---|
| S1 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | −9.5430E−06 | 0.0000E+00 | 0.0000E+00 | 0.0000E+00 | 0.0000E+00 |
| S17 | 4.1487E−05 | −2.3612E−06 | 0.0000E+00 | 0.0000E+00 | 0.0000E+00 |

Figure 25:
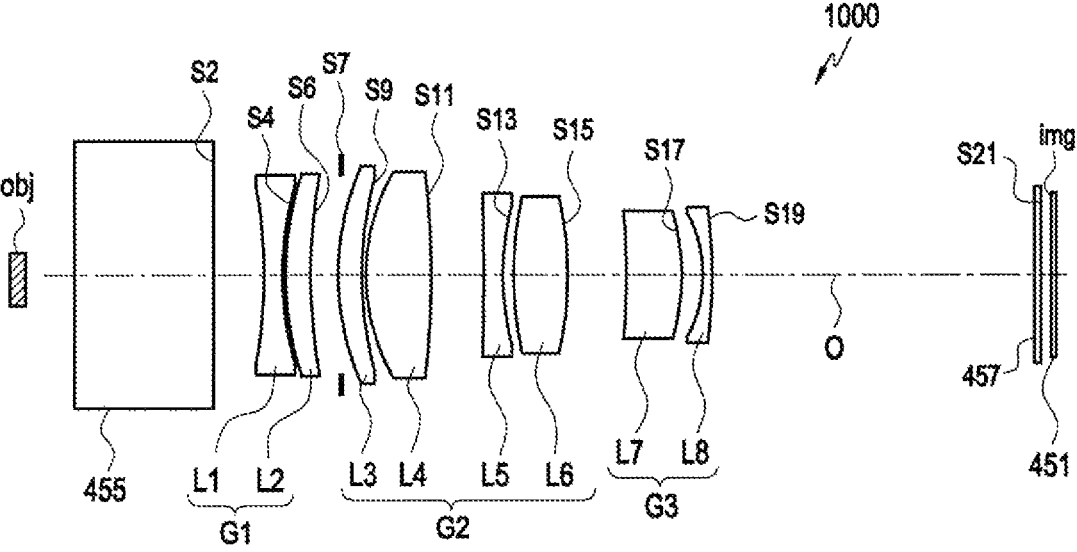
FIG. 25 is a view showing a lens (group) arrangement in a telephoto end of the lens assembly of FIG. 24.
Figure 26A:
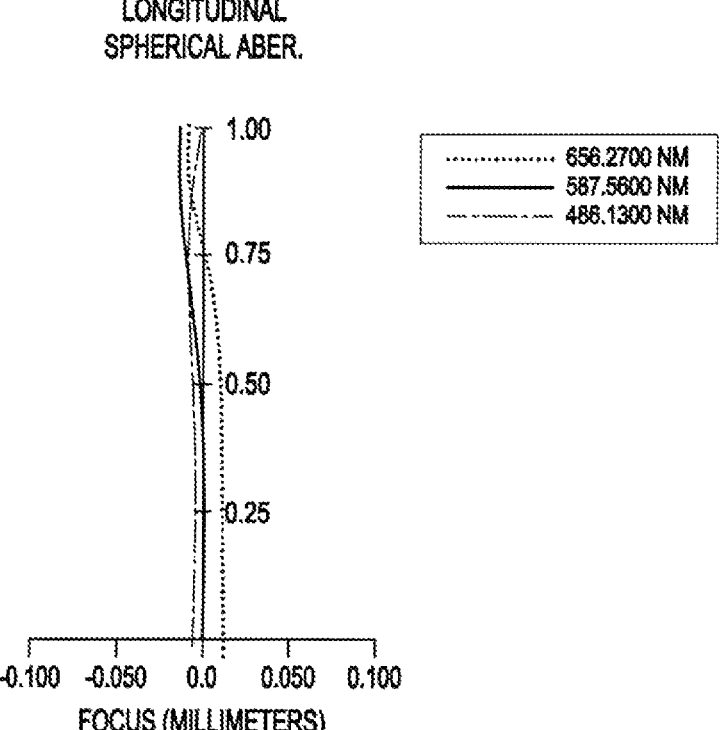
FIG. 26A is a graph showing spherical aberration of the lens assembly of FIG. 24.
Figures 26B, 26C:
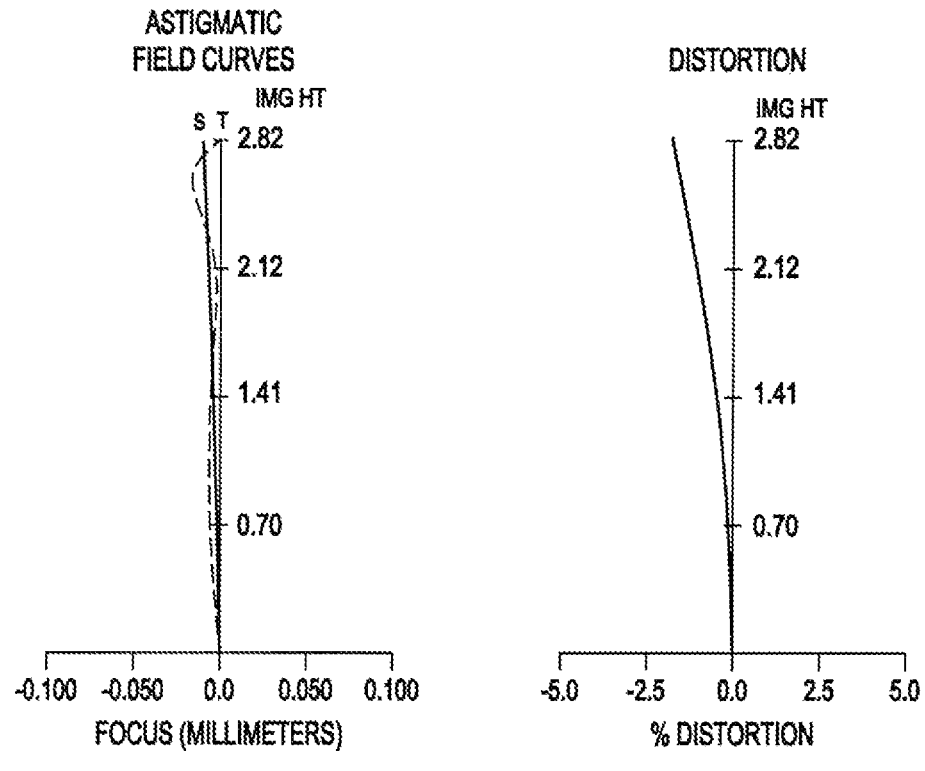
FIG. 26B is a graph showing astigmatic aberration of the lens assembly of FIG. 24.
FIG. 26C is a graph showing distortion rate of the lens assembly of FIG. 24.
Figure 27A:
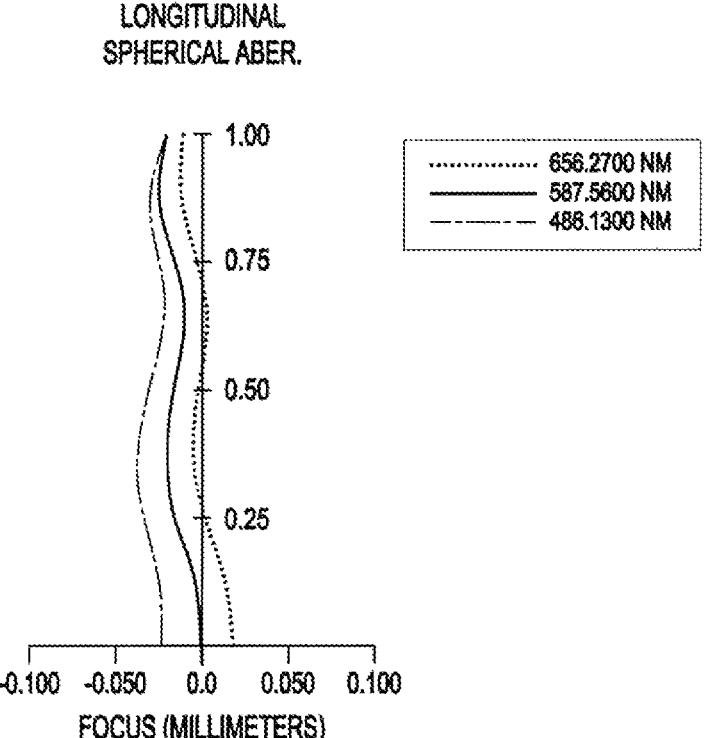
FIG. 27A is a graph showing spherical aberration of the lens assembly of FIG. 25.
Figures 27B, 27C:
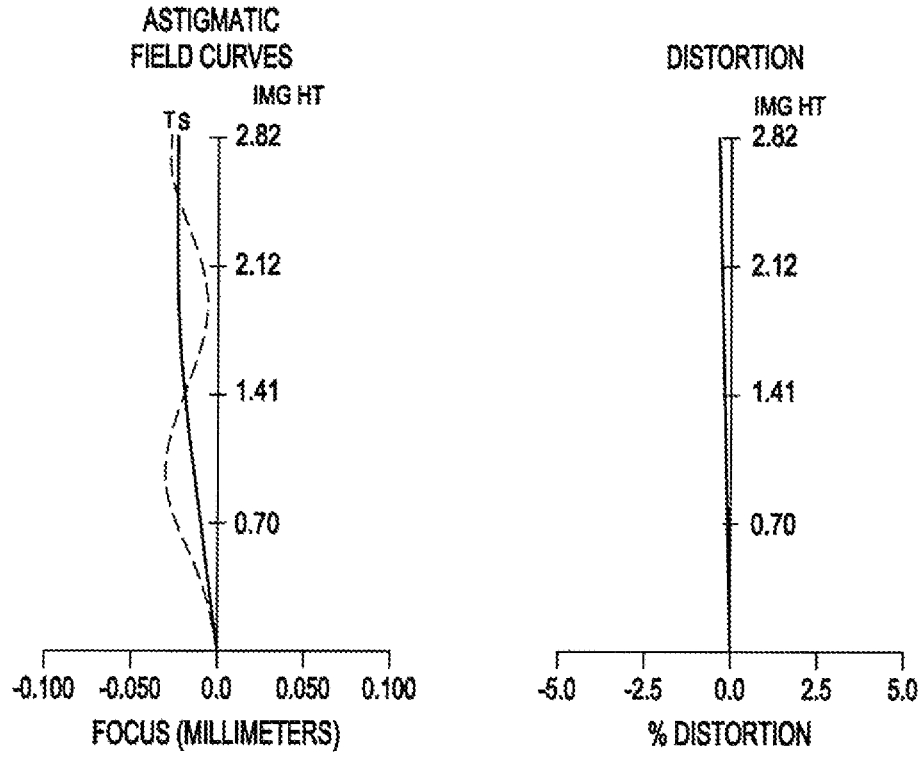
FIG. 27B is a graph showing astigmatic aberration of the lens assembly of FIG. 25.
FIG. 27C is a graph showing distortion rate of the lens assembly of FIG. 25.

FIG. 24 is a view showing a lens (group) arrangement in the wide-angle end of a lens assembly 1000 according to an embodiment of the disclosure. FIG. 25 is a view showing a lens (group) arrangement in the telephoto end of the lens assembly 1000 of FIG. 24. FIG. 26A is a graph showing spherical aberration of the lens assembly 1000 of FIG. 24. FIG. 26B is a graph showing astigmatic aberration of the lens assembly 1000 of FIG. 24. FIG. 26C is a graph showing distortion rate of the lens assembly 1000 of FIG. 24. FIG. 27A is a graph showing spherical aberration of the lens assembly 1000 of FIG. 25. FIG. 27B is a graph showing astigmatic aberration of the lens assembly 1000 of FIG. 25. FIG. 27C is a graph showing distortion rate of the lens assembly 1000 of FIG. 25.

Referring to FIG. 24 to FIG. 27C, the lens assembly 1000 (e.g., the camera module 405 of FIG. 6 or the lens assembly 500 of FIG. 7) may be configured to satisfy at least one of the configurations mentioned in the above-described embodiments or conditions presented through [Mathematical equations], and may include the reflection member 455, the first lens group G1, the second lens group G2, the third lens group G3, the infrared blocking filter 457, and/or the image sensor 451, which are arranged sequentially from the object obj side. In one embodiment, according to the forward/backward movement of the second lens group G2 and/or the third lens group G3 between the wide-angle end and the telephoto end, the lens assembly 1000 may be configured such that the focal length thereof is adjusted in the range of about 11.6-24.9 mm, the f-number thereof is adjusted in the range of about 2.9-4.7, and the field of view is adjusted in the range of about 27.6-12.9 degrees.

The following [Table 19] and [Table 20] show the lens data of the lens assembly 1000 illustrated in FIG. 24 or FIG. 25, and the following [Table 21] and [Table 22] show aspherical surface coefficients of the lenses L1, L2, L3, L4, L5, L6, L7, and L8.

TABLE 19

| Lens surface | Curvature radius | Thickness or Air gap | Refractive index | Abbe's number | Focal length | Effective radius |
|---|---|---|---|---|---|---|
| obj | infinity | infinity | | | | |
| S1 | infinity | 5.00 | 1.717 | 29.5 | | 3.885 |
| S2 | infinity | 1.80 | | | | 3.183 |
| S3* | −16.345 | 0.65 | 1.544 | 56.09 | −12.6 | 2.800 |
| S4* | 11.931 | 0.31 | | | | 2.789 |
| S5 | 12.470 | 0.85 | 1.847 | 23.78 | 33.5 | 2.825 |
| S6 | 21.583 | D1 | | | | 2.850 |
| S7(stop) | infinity | 0.00 | | | | 2.917 |
| S8 | 8.678 | 0.97 | 1.541 | 73.65 | 48.2 | 2.970 |
| S9 | 12.509 | 0.05 | | | | 2.936 |
| S10* | 6.41 | 2.20 | 1.544 | 56.09 | 9.2 | 2.961 |
| S11* | −19.592 | 1.12 | | | | 2.800 |
| S12 | −29.185 | 0.70 | 1.762 | 26.61 | −7.2 | 2.481 |
| S13 | 6.812 | 0.44 | | | | 2.349 |
| S14* | 8.301 | 2.00 | 1.535 | 55.71 | 8.7 | 2.390 |
| S15* | −9.8100 | D2 | | | | 2.350 |
| S16* | −9.6270 | 1.62 | 1.65038 | 21.52 | 19.4 | 1.880 |
| S17* | −5.8230 | 0.73 | | | | 2.009 |
| S18* | −4.2410 | 0.33 | 1.535 | 55.71 | −9.1 | 1.989 |
| S19* | −33.9940 | D3 | | | | 2.107 |
| S20 | infinity | 0.21 | 1.5168 | 64.2 | | |
| S21 | infinity | — | | | | |
| img | infinity | — | | | | |

TABLE 20

| Air gap | Wide-angle end | Telephoto end |
|---|---|---|
| D1 | 7.87 | 0.80 |
| D2 | 4.85 | 3.28 |
| D3 | 3.06 | 11.70 |

TABLE 21

| Lens surface | K | A | B | C | D |
|---|---|---|---|---|---|
| S3 | 1.5079 | −6.0942E−05 | 9.2554E−06 | −3.5493E−07 | 0.0000E+00 |
| S4 | −0.6205 | −8.4475E−05 | 1.0541E−05 | −4.0171E−07 | 0.0000E+00 |
| S10 | 0.0000 | −3.5786E−04 | −6.4829E−06 | −4.0043E−07 | 0.0000E+00 |
| S11 | −30.2213 | −2.0509E−04 | 5.1218E−06 | 0.0000E+00 | 0.0000E+00 |
| S14 | −1.7896 | 0.0000E+00 | −4.5628E−05 | 9.6051E−06 | 0.0000E+00 |
| S15 | 2.3415 | 5.5321E−04 | −3.4109E−05 | 8.4186E−06 | 0.0000E+00 |
| S16 | −11.4055 | 2.2117E−03 | −1.9012E−04 | 1.8299E−05 | −6.6570E−08 |
| S17 | −9.1553 | −2.0382E−04 | −4.5659E−04 | 3.2087E−05 | 4.0259E−06 |
| S18 | −15.0000 | −2.3148E−02 | 3.4011E−03 | −6.6660E−04 | 1.3347E−04 |
| S19 | 85.0000 | −3.4133E−03 | −2.2365E−03 | 1.2784E−03 | −3.0739E−04 |

TABLE 22

| Lens surface | E | F | G | H | J |
|---|---|---|---|---|---|
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |
| S15 | 0.0000E+00 | 0.0000E+00 | 0.0000E+00 | 0.0000E+00 | 0.0000E+00 |
| S16 | 0.0000E+00 | 0.0000E+00 | 0.0000E+00 | 0.0000E+00 | 0.0000E+00 |
| S17 | 0.0000E+00 | 0.0000E+00 | 0.0000E+00 | 0.0000E+00 | 0.0000E+00 |
| S18 | −9.5430E−06 | 0.0000E+00 | 0.0000E+00 | 0.0000E+00 | 0.0000E+00 |
| S19 | 4.1487E−05 | −2.3612E−06 | 0.0000E+00 | 0.0000E+00 | 0.0000E+00 |

As described above, according to an embodiment of the disclosure, a lens assembly (e.g., the camera module 405 of FIG. 6 or the lens assembly 500 of FIG. 7) and/or an electronic device (e.g., the electronic devices 101, 200, 300, or 400 of FIG. 1 to FIG. 6) including same may include an image sensor (e.g., the image sensor 451 of FIG. 6 or FIG. 7) configured to capture an image of an object, a first lens group (e.g., the first lens group G1 of FIG. 6 or FIG. 7) disposed closest to an object (e.g., the object obj of FIG. 8) side in three lens groups (e.g., the lens groups G1, G2, and G3 of FIG. 6 or FIG. 7) sequentially arranged from the object toward an image sensor along the direction of an optical axis (e.g., the optical axis O of FIG. 6 or FIG. 7), the first lens group including multiple lenses and having negative power, a second lens group (e.g., the second lens group G2 of FIG. 6 or FIG. 7) disposed to be moveable forward/backward along the optical axis direction between the image sensor and the first lens group, the second lens group having positive power, and a third lens group (e.g., the third lens group G3 of FIG. 6 or FIG. 7) disposed to be moveable forward/backward along the optical axis direction between the image sensor and the second lens group, the third lens group including multiple lenses and having negative power, wherein the second lens group and/or the third lens group may be configured to move toward the object in a zooming operation so as to increase the focal length of the lens assembly, and the second lens group may include a lens (e.g., the (2-3)rd lens L5 of FIG. 7) having negative power and a lens (e.g., the (2-2)nd lens L4 of FIG. 7) having positive power and is disposed adjacent to the lens having negative power on the object side, and the lens assembly may be configured to satisfy the following [Condition formula 1], $$0.1 \leq G2_{air}/tG2 \leq 0.3 \qquad \text{[Condition formula 1]}$$

wherein the "G2_air" may be an air gap between the lens having positive power and the lens having negative power along the optical axis direction, and the "tG2" may be a distance between an object side-surface of a lens closest to the object in the second lens group, and an image sensor-side surface of a lens closest to the image sensor along the optical axis direction in the second lens group.

According to an embodiment, the second lens group may include a (2-1)st lens (e.g., the (2-1)st lens L3 of FIG. 7) having positive power, a (2-2)nd lens (e.g., the (2-2)nd lens L4 of FIG. 7) having positive power which is the lens having positive power, a (2-3)rd lens (e.g., the (2-3)rd lens L5 of FIG. 7) having negative power which is the lens having negative power, and a (2-4)th lens (e.g., the (2-4)th lens L6 of FIG. 7) having positive power, which are sequentially arranged from the object side to the image sensor, and the air gap "G2_air" may be an air gap between the (2-2)nd lens and the (2-3)rd lens.

According to an embodiment, the lens (e.g., the (2-4)th lens L6 of FIG. 7) closest to the image sensor in the second lens group, may have positive power, and the lens assembly may be configured to satisfy the following [Condition formula 2], $$0.85 \leq f_{G2P}/f_{G2} \leq 1.25 \qquad \text{[Condition formula 2]}$$

wherein the "f_G2P" may be the focal length of the lens closest to the image sensor in the second lens group, and "f_G2" is the entire focal length of the second lens group.

According to an embodiment, the lens assembly and/or an electronic device including same may further include an aperture (e.g., a surface indicated by "S5" of FIG. 8) disposed between a lens closest to the object in the first lens group, and a lens closest to the image sensor in the second lens group, and the lens assembly may be configured to satisfy the following [Condition formula 3], $$0.4 \leq Dz/Dy \leq 0.98 \qquad \text{[Condition formula 3]}$$

wherein the "Dy" may be a first length of the effective diameter of the aperture, and the "Dz" may be a second length of the effective diameter of the aperture in a direction perpendicular to the first length.

According to an embodiment, an edge of at least one lens of the first lens group or an edge of at least one lens of the second lens group may include a pair of first curve sections (e.g., the first curve sections CS1 of FIG. 7) and a pair of second curve sections (e.g., the second curve sections CS2 of FIG. 7) having a curvature which is at least partially different from that of the first curve sections.

According to an embodiment, the first curve sections and the second curve sections may be alternately arranged along the edge of at least one lens of the first lens group or the edge of at least one lens of the second lens group.

According to an embodiment, the lens assembly and/or an electronic device including same may further include an aperture (e.g., a surface indicated by "S5" of FIG. 8) disposed between a lens closest to the object in the first lens group, and a lens closest to the image sensor in the second lens group, and the lens assembly may be configured to satisfy the following [Condition formula 4], $$0.4 \leq Dz/Dy \leq 0.98 \qquad \text{[Condition formula 4]}$$

wherein the "Dy" may be a first length of the effective diameter of the aperture measured along a direction parallel to a major diameter of a lens including the first curve sections and the second curve sections, and the "Dz" may be a second length of the effective diameter of the aperture measured along a direction parallel to a minor diameter of the lens including the first curve sections and the second curve sections.

According to an embodiment, the lens assembly and/or an electronic device including same may further include a reflection member (e.g., the reflection member 455 of FIG. 6 or FIG. 7) disposed at the object side of the first lens group, wherein the reflection member may be configured to guide or reflect light, which is incident from the outside of the lens assembly, to the first lens group.

According to an embodiment, the reflection member may be configured to perform at least one of a rolling motion of rotating around the optical axis direction, a pitching motion of rotating around a first axis which perpendicularly intersects to the optical axis direction, or a yawing motion of around a second axis which perpendicularly intersects to the optical axis direction and the first axis, so as to implement an image stabilization function.

According to an embodiment, the second lens group and the third lens group may be configured to move along the optical axis direction so as to adjust the focal length of the lens assembly, and one of the second lens group and the third lens group may be configured to move along the optical axis direction with respect to the other so as to adjust the focus of the lens assembly.

According to an embodiment, the first lens group may include a (1-1)st lens which is disposed closest to the object and has negative power, and a (1-2)nd lens which is disposed at the image sensor side of the (1-1)st lens and has positive power.

According to an embodiment, the third lens group may include a (3-1)st lens which is disposed closest to the object and has positive power, and a (3-2)nd lens which is disposed at the image sensor side of the (3-1)st lens and has negative power.

According to an embodiment, at least one lens of the first lens group or at least one lens of the second lens group may be made of glass.

According to an embodiment, the lens assembly and/or an electronic device including same may include an infrared blocking filter (e.g., the infrared blocking filter 457 of FIG. 6 or FIG. 7) disposed between the third lens group and the image sensor.

According to an embodiment of the disclosure, an electronic device (e.g., the electronic devices 101, 200, 300, or 400 of FIG. 1 to FIG. 6) may include a processor (e.g., the processor 120 of FIG. 1) and a lens assembly (e.g., the camera module 405 of FIG. 6 or the lens assembly 500 of FIG. 7), wherein the lens assembly may include an image sensor (e.g., the image sensor 451 of FIG. 6 or FIG. 7) configured to capture an image of an object, a first lens group (e.g., the first lens group G1 of FIG. 6 or FIG. 7), which is disposed closest to the object (e.g., the object of FIG. 8) side in three lens groups (e.g., the lens groups G1, G2, and G3 of FIG. 6 or FIG. 7) sequentially arranged from the object toward an image sensor along the direction of an optical axis (e.g., the optical axis O of FIG. 6 or FIG. 7), the first lens group including multiple lenses and having negative power, a second lens group (e.g., the second lens group G2 of FIG. 6 or FIG. 7) disposed to be moveable forward/backward along the optical axis direction between the image sensor and the first lens group, the second lens group having positive power, and a third lens group (e.g., the third lens group G3 of FIG. 6 or FIG. 7) disposed to be moveable forward/backward along the optical axis direction between the image sensor and the second lens group, the third lens group including multiple lenses and having negative power, the processor may be configured to move at least one of the second lens group and the third lens group to the object side in a zooming operation so as to increase the focal length of the lens assembly, the second lens group may include a lens (e.g., the (2-3)rd lens L5 of FIG. 7) having negative power and a lens (e.g., the (2-2)nd lens L4 of FIG. 7) having positive power and is disposed adjacent to the lens having negative power on the object side, and the lens assembly may be is configured to satisfy the following [Condition formula 1], $$0.1 \leq G2_{air}/tG2 \leq 0.3, \qquad \text{[Condition formula 5]}$$

wherein the "G2_air" may be an air gap between the lens having positive power and the lens having negative power along the optical axis direction, and the "tG2" may be a distance between an object side-surface of a lens closest to the object in the second lens group, and an image sensor-side surface of a lens closest to the image sensor along the optical axis direction in the second lens group.

According to an embodiment, the second lens group may include a (2-1)st lens (e.g., the (2-1)st lens L3 of FIG. 7) having positive power, a (2-2)nd lens (e.g., the (2-2)nd lens L4 of FIG. 7) having positive power which is the lens having positive power, a (2-3)rd lens (e.g., the (2-3)rd lens L5 of FIG. 7) having negative power which is the lens having negative power, and a (2-4)th lens (e.g., the (2-4)th lens L6 of FIG. 7) having positive power, which are sequentially arranged from the object side to the image sensor, and the air gap "G2_air" may be an air gap between the (2-2)nd lens and the (2-3)rd lens.

According to an embodiment, a lens (e.g., the (2-4)th lens L6 of FIG. 7) closest to the image sensor in the second lens group, has positive power, and the lens assembly may be configured to satisfy the following [Condition formula], $$0.85 \leq f_{G2P}/f_{G2} \leq 1.25, \qquad \text{[Condition formula 6]}$$

wherein "f_G2P" is the focal length of the lens closest to the image sensor in the second lens group, and "f_G2" is the entire focal length of the second lens group.

According to an embodiment, the electronic device (or the lens assembly) may further include an aperture (e.g., a surface indicated by "S5" of FIG. 8) disposed between a lens closest to the object in the first lens group, and the lens closest to the image sensor in the second lens group, wherein the lens assembly is configured to satisfy the following [Condition formula 7], $$0.4 \leq Dz/Dy \leq 0.98, \qquad \text{[Condition formula 7]}$$

wherein the "Dy" may be a first length of the effective diameter of the aperture, and the "Dz" may be a second length of the effective diameter of the aperture in a direction perpendicular to the first length.

According to an embodiment, an edge of at least one lens of the first lens group or an edge of at least one lens of the second lens group may include a pair of first curve sections (e.g., the first curve sections CS1 of FIG. 7) and a pair of second curve sections (e.g., the second curve sections CS2 of FIG. 7) having a curvature which is at least partially different from that of the first curve sections, and the first curve sections and the second curve sections may be alternately arranged along the edge of at least one lens of the first lens group or the edge of at least one lens of the second lens group.

According to an embodiment, the processor may be configured to move the second lens group or the third lens group along the optical axis direction so as to adjust the focal length of the lens assembly, and is configured to move one of the second lens group and the third lens group along the optical axis direction with respect to the other so as to adjust the focus of the lens assembly.

While the disclosure has been described with respect to various embodiments, it should be understood that the various embodiments do not limit the disclosure but are exemplary. In addition, it should be obvious to a person skilled in the art that various changes in forms and details can be made without the scope departing from the entire viewpoint of the disclosure including the claims and their equivalents. For example, the lens assembly (e.g., the camera module 405 of FIG. 6 or the lens assembly 500 of FIG. 7) of the above-described embodiments may further include an additional lens (group) disposed between the third lens group G3 and the image sensor 451.

What is claimed is:

1. A lens assembly comprising:

an image sensor configured to capture an image of an object;

a first lens group disposed closest to an object side in three lens groups sequentially arranged from the object side toward the image sensor along an optical axis direction, the first lens group including multiple lenses and having negative power;

a second lens group disposed to be moveable forward/backward along the optical axis direction between the image sensor and the first lens group, the second lens group having positive power; and a third lens group disposed to be moveable forward/backward along the optical axis direction between the image sensor and the second lens group, the third lens group including multiple lenses and having negative power, wherein:

the second lens group and/or the third lens group is configured to move toward the object side in a zooming operation so as to increase a focal length of the lens assembly, and the second lens group comprises a (2-1)st lens having positive power, a (2-2)nd lens having positive power, a (2-3)rd lens having negative power, and a (2-4)th lens having positive power, which are sequentially arranged from the object side toward the image sensor, at least one lens in the first lens group and the second lens group has a non-circular shape, and an edge of the at least one lens in the first lens group and the second lens group is treated with black painting, by digging, or with carbonation, and the lens assembly is configured to satisfy the following [Condition formulas 1 and 2]:

$$0.1 \leq G2_{air}/tG2 \leq 0.3 \qquad \text{[Condition formula 1]}$$

$$0.85 \leq f_{G2P}/f_{G2} \leq 1.25 \qquad \text{[Condition formula 2]}$$

wherein "G2_air" is an air gap between the (2-2)nd lens and the (2-3)rd lens along the optical axis direction, and "tG2" is a distance between an object-side surface of a lens closest to the object in the second lens group, and an image sensor-side surface of a lens closest to the image sensor along the optical axis direction in the second lens group, and wherein "f_G2P" is a focal length of the (2-4)th lens closest to the image sensor in the second lens group, and "f_G2" is an entire focal length of the second lens group, wherein the lens group has a focal length between 11.2 mm and 11.6 mm and a field of view from between 20 degrees and 28.3 degrees when configured for wide angle, and a focal length between 24.9 mm and 27.5 mm and a field of view between 11.6 degrees and 16.5 degrees when configured for telephoto.

2. The lens assembly of claim 1, further comprising:

an aperture disposed between a lens closest to the object in the first lens group, and the lens closest to the image sensor in the second lens group, and the lens assembly is configured to satisfy the following [Condition formula 3]:

$$0.4 \leq Dz/Dy \leq 0.98 \qquad \text{[Condition formula 3]}$$

wherein "Dy" is a first length of an effective diameter of the aperture, and "Dz" is a second length of the effective diameter of the aperture in a direction perpendicular to the first length, wherein the aperture has a non-circular shape.

3. The lens assembly of claim 1, wherein an edge of at least one lens of the first lens group or an edge of at least one lens of the second lens group includes a pair of first curve sections and a pair of second curve sections having a curvature which is at least partially different from that of the first curve sections, and wherein the edge of the at least one lens in the first lens group and the second lens group treated with black painting, by digging, or with carbonation is at least one of the pair of first curve sections and the pair of second curve sections.

4. The lens assembly of claim 3, wherein the first curve sections and the second curve sections are alternately arranged along the edge of at least one lens of the first lens group or the edge of at least one lens of the second lens group.

5. The lens assembly of claim 3, further comprising:

an aperture disposed between a lens closest to the object in the first lens group, and the lens closest to the image sensor in the second lens group, and the lens assembly is configured to satisfy the following [Condition formula 4]:

$$0.4 \leq Dz/Dy \leq 0.98 \qquad \text{[Condition formula 4]}$$

wherein "Dy" is a first length of an effective diameter of the aperture measured along a direction parallel to a major diameter of a lens including the first curve sections and the second curve sections, and "Dz" is a second length of the effective diameter of the aperture measured along a direction parallel to a minor diameter of the lens including the first curve sections and the second curve sections.

6. The lens assembly of claim 1, further comprising a reflection member disposed at the object side of the first lens group, wherein the reflection member is configured to guide or reflect light, which is incident from outside the lens assembly, to the first lens group.

7. The lens assembly of claim 6, wherein the reflection member is configured to perform a rolling motion of rotating around the optical axis direction, a pitching motion of rotating around a first axis which intersects perpendicularly to the optical axis direction, and/or a yawing motion of rotating around a second axis which intersects perpendicularly to the optical axis direction and the first axis, so as to implement an image stabilization function.

8. The lens assembly of claim 1, wherein the second lens group and the third lens group are configured to move along the optical axis direction so as to adjust the focal length of the lens assembly, and one of the second lens group and the third lens group is configured to move along the optical axis direction with respect to the other so as to adjust a focus of the lens assembly.

9. The lens assembly of claim 1, wherein the first lens group further comprises a (1-1)st lens which is disposed closest to the object and has negative power, and a (1-2)nd lens which is disposed at an image sensor side of the (1-1)st lens and has positive power.

10. The lens assembly of claim 1, wherein the third lens group further comprises a (3-1)st lens which is disposed closest to the object and has positive power, and a (3-2)nd lens which is disposed at an image sensor side of the (3-1)st lens and has negative power.

11. The lens assembly of claim 1, wherein at least one lens of the first lens group or at least one lens of the second lens group is made of glass.

12. The lens assembly of claim 1, further comprising an infrared blocking filter disposed between the third lens group and the image sensor.

13. An electronic device comprising:

a processor; and a lens assembly, wherein the lens assembly comprises:

an image sensor configured to capture an image of an object;

a first lens group disposed closest to an object side in three lens groups sequentially arranged from the object side toward the image sensor along an optical axis direction, the first lens group including multiple lenses and having negative power;

a second lens group disposed to be moveable forward/backward along the optical axis direction between the image sensor and the first lens group, the second lens group having positive power; and a third lens group disposed to be moveable forward/backward along the optical axis direction between the image sensor and the second lens group, the third lens group including multiple lenses and having negative power, wherein:

the second lens group and/or the third lens group is configured to move toward the object side in a zooming operation so as to increase a focal length of the lens assembly, and the second lens group comprises a (2-1)st lens having positive power, a (2-2)nd lens having positive power, a (2-3)rd lens having negative power, and a (2-4)th lens having positive power, which are sequentially arranged from the object side toward the image sensor, at least one lens in the first lens group and the second lens group has a non-circular shape, and an edge of the at least one lens in the first lens group and the second lens group is treated with black painting, by digging, or with carbonation, and the lens assembly is configured to satisfy the following [Condition formulas 1 and 2]:

$$0.1 \le G2_{air}/tG2 \le 0.3 \qquad \text{[Condition formula 1]}$$

$$0.85 \le f_{G2P}/f_{G2} \le 1.25 \qquad \text{[Condition formula 2]}$$

wherein "G2_air" is an air gap between the (2-2)nd lens and the (2-3)rd lens along the optical axis direction, and "tG2" is a distance between an object-side surface of a lens closest to the object in the second lens group, and an image sensor-side surface of a lens closest to the image sensor along the optical axis direction in the second lens group, and wherein "f_G2P" is a focal length of the (2-4)th lens closest to the image sensor in the second lens group, and "f_G2" is an entire focal length of the second lens group, wherein the lens group has a focal length between 11.2 mm and 11.6 mm and a field of view from between 20 degrees and 28.3 degrees when configured for wide angle, and a focal length between 24.9 mm and 27.5 mm and a field of view between 11.6 degrees and 16.5 degrees when configured for telephoto.

14. The electronic device of claim 13, further comprising:

an aperture disposed between a lens closest to the object in the first lens group, and the lens closest to the image sensor in the second lens group, wherein the lens assembly is configured to satisfy the following [Condition formula 7]:

$$0.4 \le Dz/Dy \le 0.98 \qquad \text{[Condition formula 7]}$$

wherein "Dy" is a first length of an effective diameter of the aperture, and "Dz" is a second length of the effective diameter of the aperture in a direction perpendicular to the first length.

15. The electronic device of claim 13, wherein:

an edge of at least one lens of the first lens group or an edge of at least one lens of the second lens group includes a pair of first curve sections and a pair of second curve sections having a curvature which is at least partially different from the first curve sections, the edge of the at least one lens in the first lens group and the second lens group treated with black painting, by digging, or with carbonation is at least one of the pair of first curve sections and the pair of second curve sections, and the first curve sections and the second curve sections are alternately arranged along the edge of at least one lens of the first lens group or the edge of at least one lens of the second lens group.

16. The electronic device of claim 13, wherein the processor is configured to move the second lens group or the third lens group along the optical axis direction so as to adjust the focal length of the lens assembly, and is configured to move one of the second lens group and the third lens group along the optical axis direction with respect to the other so as to adjust a focus of the lens assembly.

* * * * *